(12) United States Patent
Breitwieser et al.

(10) Patent No.: US 11,791,473 B2
(45) Date of Patent: Oct. 17, 2023

(54) METHOD FOR PRODUCING A COMPOSITE LAYER, ELECTROCHEMICAL UNIT AND USE OF THE COMPOSITE LAYER

(71) Applicant: Hahn-Schickard-Gesellschaft für angewandte Forschung e.V., Villingen-Schwenningen (DE)

(72) Inventors: Matthias Breitwieser, Freiburg (DE); Florian Lombeck, Freiburg (DE)

(73) Assignee: Hahn-Schickard-Gesellschaft für angewandte Forschung e.V., Villingen-Schwenningen (DE)

( * ) Notice: Subject to any disclaimer, the term of this patent is extended or adjusted under 35 U.S.C. 154(b) by 0 days.

(21) Appl. No.: 17/408,046

(22) Filed: Aug. 20, 2021

(65) Prior Publication Data

US 2021/0384521 A1 Dec. 9, 2021

Related U.S. Application Data

(63) Continuation of application No. PCT/EP2020/053976, filed on Feb. 14, 2020.

(30) Foreign Application Priority Data

Feb. 22, 2019 (DE) ...................... 10 2019 104 561.4

(51) Int. Cl.
*H01M 4/88* (2006.01)
*H01M 8/1053* (2016.01)
(Continued)

(52) U.S. Cl.
CPC ....... *H01M 4/8892* (2013.01); *H01M 4/8832* (2013.01); *H01M 8/1011* (2013.01);
(Continued)

(58) Field of Classification Search
None
See application file for complete search history.

(56) References Cited

U.S. PATENT DOCUMENTS

| 5,547,551 A | 8/1996 | Bahar et al. |
| 5,654,109 A | 8/1997 | Plowman et al. |

(Continued)

FOREIGN PATENT DOCUMENTS

| CN | 101237055 | 8/2008 |
| CN | 101170183 | 4/2011 |

(Continued)

OTHER PUBLICATIONS

Klose et al., Electrospun sulfonated poly(ether ketone) nanofibers as proton conductive reinforcement for durable Nation composite membranes, Journal of Power Sources, vol. 361, 2017, pp. 237-242, ISSN 0378-7753 (Year: 2017).*

(Continued)

*Primary Examiner* — Ula C Ruddock
*Assistant Examiner* — Scott J. Chmielecki
(74) *Attorney, Agent, or Firm* — Womble Bond Dickinson (US) LLP

(57) ABSTRACT

A method is proposed by means of which a composite layer is producible in as simple and controlled a manner as possible, and by means of which composite layers with different predetermined properties can be produced with as little expenditure as possible, and thus economically. The method includes: providing a nanofiber material, comminuting the nanofiber material while forming nanorods, providing a liquid medium, which comprises an ionomer component and a dispersant, dispersing the nanorods in the liquid medium while forming a nanorod ionomer dispersion, and applying the nanorod ionomer dispersion to a surface region of a substrate while forming a composite layer. An electro- (Continued)

chemical unit including the composite layer is provided. The composite layer is useful in a fuel cell (hydrogen fuel cell or direct alcohol fuel cell), in a redox flow cell, in an electrolytic cell, or in an ion exchanger, and useful for anion or proton conduction.

25 Claims, 15 Drawing Sheets

(51) Int. Cl.
*H01M 8/1081* (2016.01)
*H01M 8/1011* (2016.01)
*H01M 8/10* (2016.01)

(52) U.S. Cl.
CPC ....... *H01M 8/1053* (2013.01); *H01M 8/1081* (2013.01); *H01M 2008/1095* (2013.01)

(56) References Cited

U.S. PATENT DOCUMENTS

| | | | |
|---|---|---|---|
| 5,985,942 | A | 11/1999 | Steck et al. |
| 8,641,960 | B1 | 2/2014 | Medeiros et al. |
| 2002/0192533 | A1 | 12/2002 | Gebhardt et al. |
| 2003/0059657 | A1 | 3/2003 | Stone et al. |
| 2005/0048341 | A1 | 3/2005 | Kurano et al. |
| 2005/0214611 | A1 | 9/2005 | Hommura |
| 2006/0188774 | A1 | 8/2006 | Niu et al. |
| 2007/0067881 | A1 | 3/2007 | Lin et al. |
| 2007/0099052 | A1 | 5/2007 | Frey et al. |
| 2013/0280642 | A1 | 10/2013 | Gummalla et al. |
| 2014/0038076 | A1 | 2/2014 | Pintauro et al. |
| 2014/0093790 | A1* | 4/2014 | Liu ............. H01M 4/9083 429/405 |
| 2014/0134506 | A1* | 5/2014 | Kub ............. H01M 8/0289 429/413 |
| 2014/0349213 | A1 | 11/2014 | Pintauro et al. |
| 2017/0250431 | A1 | 8/2017 | Pintauro et al. |
| 2017/0279142 | A1 | 9/2017 | Jones et al. |
| 2021/0122125 | A1* | 4/2021 | McDowell .......... B29C 35/0222 |

FOREIGN PATENT DOCUMENTS

| | | |
|---|---|---|
| JP | 2009-245639 | 10/2009 |
| WO | WO 2008/011840 | 1/2008 |
| WO | WO 2008/028428 | 3/2008 |
| WO | WO 2009/049565 | 4/2009 |

OTHER PUBLICATIONS

Klose et al., Electrospun sulfonated poly(ether ketone) nanofibers as proton conductive reinforcement for durable Nafion composite membranes, Journal of Power Sources, vol. 361, 2017, pp. 237-242, ISSN 0378-7753 (Year: 2017).*
Niu et al., Fiber Generators in Needleless Electrospinning, Journal of Nanomaterials, 2012, pp. 1-13 (Year: 2012).*
Sood et al., Electrospun nanofibre composite polymer electrolyte fuel cell and electrolysis membranes, Nano Energy, vol. 26, 2016, pp. 729-745 (Year: 2016).*
Arya, A., et al., "Polymer Nanocomposites: synthesis and characterization," arxiv.org, Cornell University Library, 2018, XP081245871.
Fong, H., et al., "Beaded nanofibers formed during electrospinning," Polymer, 1999, vol. 40, pp. 4585-4592.
Liu, S., et al. "Electrospun multifunctional sulfonated carbon nanofibers for design and fabrication of SPEEK composite proton exchange membranes for direct methanol fuel cell application," International Journal of Hydrogen Energy, vol. 42(15), 2017, pp. 10275-10284.
Medeiros, E.S., et al., "Solution Blow Spinning: A New Method to Produce Micro- and Nanofibers from Polymer Solutions," Journal of Applied Polymer Science, 2009, vol. 113, pp. 2322-2330.
Mohapatra, S.R., et al., "Flexible resisting switching memory using inkjet printing of a solid polymer electrolyte," AIP Advances 2, 2012.
Zhiming, Z., et al., "Research on the development of the centifugal spinning," MATEC Web of conferences, 2017, 95, 07003.

* cited by examiner

METHOD FOR PRODUCING A COMPOSITE LAYER, ELECTROCHEMICAL UNIT AND USE OF THE COMPOSITE LAYER

CROSS REFERENCE TO RELATED APPLICATIONS

This application is a continuation of international application number PCT/EP2020/053976, filed on Feb. 14, 2020, which claims the benefit of German application number 10 2019 104 561.4, filed on Feb. 22, 2019, which applications are hereby incorporated by reference in their entirety and for all purposes in this application.

BACKGROUND OF THE INVENTION

The present invention relates to a method for producing a composite layer for electrochemical applications.

The present invention further relates to an electrochemical unit, comprising a composite layer in accordance with the invention.

The present invention further relates to the use of a composite layer in accordance with the invention in a fuel cell, in particular a hydrogen fuel cell or a direct alcohol fuel cell, in a redox flow cell, in an electrolytic cell, or in an ion exchanger.

The scientific article "Cerium oxide decorated polymer nanofibers as effective membrane reinforcement for durable, high-performance fuel cells", M. Breitwieser et. al., Adv. Energy Mat. (2017) 1602100, discloses the production of composite membranes for fuel cells by means of direct membrane deposition. The article discloses poly(vinylidene fluoride-co-hexafluoropropylene) nanofibers, which are decorated with $CeO_2$-nanoparticles, and the direct generation thereof by means of electrospinning onto gas diffusion electrodes. The resulting nanofiber fabric is then impregnated by means of inkjet printing with a Nafion® ionomer dispersion. Nafion® ionomers are perfluorated copolymers containing sulfonic acid groups.

The scientific publications "Electrospun sulfonated poly (ether ketone) nanofibers as proton conductive reinforcement for durable nafion composite membranes", C. Klose et al., Journal of Power Sources, 361 (2017) 237-242, and "Simple fabrication of 12 µm thin nanocomposite fuel cell membranes by direct electrospinning and printing", M. Breitwieser et al., Journal of Power Sources 337 (2017) 137-144, disclose an application of fiber woven fabrics produced by electrospinning and a subsequent impregnation with Nafion® by print coating.

The stated articles deal with the production of electrochemically active composite layers.

US 2005/0214611 A1 discloses polymer membranes, which comprise an ion exchanger resin and melt-spun fluororesin fibers.

US 2017/0279142 A1 discloses electrolyte membranes, which comprise a porous nanofiber mat and an ionically conductive polymer.

CN 201170183 B discloses membranes, which are reinforced with carbon nanotubes.

CN 101237055 A discloses perfluoro proton exchange membranes, which are reinforced with inorganic fibers.

Electrochemically active composite layers serve to conduct, in particular charged, reactants or products of an electrochemical reaction, for example to conduct protons or anions. Electrochemically active composite layers typically comprise ionomers and one or more components, for example nanofibers, for mechanical reinforcement.

In the production of electrochemically active composite layers according to the prior art, typically a plurality of working steps are required for integrating nanofibers into an ionomer material. This increases, for one, the time requirement and economic cost and, for another, makes the composite layers inaccessible for a so-called roll-to-roll method.

In roll-to-roll methods, to coat a surface, typically a flexible foil material is unrolled from a roll and after the treatment (here: coating) is again rolled up for intermediate storage.

In accordance with an embodiment of the invention, a method is provided by means of which a composite layer is producible in as simple and controlled a manner as possible, and by means of which composite layers with different predetermined properties can be produced with as little expenditure as possible, and thus economically.

SUMMARY OF THE INVENTION

In accordance with an embodiment of the invention, a method is provided for producing a composite layer, wherein the method comprises:
  providing a nanofiber material;
  comminuting the nanofiber material while forming nanorods;
  providing a liquid medium, which comprises an ionomer component and a dispersant;
  dispersing the nanorods in the liquid medium while forming a nanorod ionomer dispersion; and
  applying the nanorod ionomer dispersion to a surface region of a substrate while forming a composite layer.

Nanorods result from the comminution of the nanofiber material, which, unlike a non-comminuted nanofiber material, are dispersible, in particular in a simple manner.

Due to the dispersibility, an ionomer-containing dispersion can be produced and the nanorods thus can be applied to the substrate in one working step together with the ionomer component. Thus an additional working step for the application of the ionomer component is unnecessary.

Moreover, by forming the nanorod ionomer dispersion, a mixing of the nanofiber material comminuted into nanorods and the ionomer component can be optimized. Thus, the nanorods can come into contact with or be embedded in the ionomer component. This can enable a uniformly good proton conductivity or anion conductivity in the resulting composite layer over an entire longitudinal extent of the composite layer.

Within the meaning of the invention, "nanorods" comprise all structures whose extent in a first spatial direction is greater by a factor of 100 or more than extents in the other spatial directions, which are oriented perpendicular to the first spatial direction. Extents in the other spatial directions of the nanorods are each about 3000 nm or less, in particular about 1000 nm or less. For example, the term "nanorods" also comprises so-called nanowires and so-called nanowhiskers.

The composite layer is preferably suitable as a constituent part of a membrane in a low-temperature fuel cell, in particular in a polymer electrolyte fuel cell.

The composite layer preferably forms a layer of a polymer electrolyte membrane of the polymer electrolyte fuel cell. The polymer electrolyte membrane is arranged in the polymer electrolyte fuel cell typically between two catalyst layers of electrodes of the polymer electrolyte fuel cell.

Alternatively, the polymer electrolyte membrane may be formed entirely from the composite layer.

Provision may be made that the nanorod ionomer dispersion is applied only to individual regions of a surface of the substrate. For this purpose, e.g., masks can be used, such that regions of the substrate with the composite layer can be produced next to regions of the substrate without the composite layer in a controlled and spatially separated manner.

Alternatively, provision may be made that the composite layer is applied completely to the entire surface of the substrate to be coated.

The composite layer can be formed, in particular, to be able to be handled separately. With less pronounced interactions between the surface of the substrate and the composite layer, the composite layer is detachable from the surface region of the substrate after the formation of the composite layer.

The substrate may be a constituent part of an electrode or may be a carrier film. This is explained later in more detail.

The liquid medium may consist substantially of the ionomer component and the dispersant.

The dispersant may be a solvent within the meaning of the invention. The ionomer component may be completely dissolved, partially dissolved and partially dispersed, or substantially exclusively dispersed in the dispersant.

Preferred dispersants are alcohols, alcohol mixtures, and alcohol-water mixtures. In particular, methanol, ethanol, 2-propanol or 1-butanol, or mixtures thereof or mixtures of these alcohols with water are preferred. A multiplicity of, in particular also polar, substances can be dissolved well in the stated dispersants and the stated dispersants are not highly toxic.

However, dispersant additives or further additives may be contained in the liquid medium. Dispersant additives or further additives support, in particular, a dissolving or dispersion of the ionomer component and/or the nanorods. The dispersant additives or further additives are preferably substantially exclusively dissolved in the dispersant, partially dissolved in the dispersant and partially dispersed in the dispersant, or substantially exclusively dispersed in the dispersant.

The nanofiber material is preferably provided by means of an electrospinning method.

Electrospinning methods for nanofibers made of polymeric materials are known, e.g., from the scientific article H. Fong et al., "Beaded nanofibers formed during electrospinning", Polymer, Vol. 40 (1999) 4585-4592.

In an electrospinning method, typically a precursor solution is injected through a nozzle into an electric field at a defined injection rate. The electric field is created by an acceleration voltage, which is applied between the nozzle and a counter electrode. The nozzle and the counter electrode are hereby located at a defined distance from one another. In particular, a nozzle is selected with a diameter that is optimized with regard to the respective material of the nanofibers to be produced. After injection, the precursor solution is drawn off of the nozzle due to an applied acceleration voltage and is accelerated toward the counter electrode. During this process, nanofibers are formed, which are deposited on a substrate or on the counter electrode.

The precursor solution comprises a suitable solvent and/or dispersant and one or more starting materials, which may each be selected according to the type of the nanofiber material to be produced.

DETAILED DESCRIPTION OF THE INVENTION

The injection rate in the electrospinning method in accordance with the invention is preferably in a range from about 0.1 µl/min to about 600 µl/min.

Preferred nanofiber materials comprise nanofibers on the basis of polymeric material, on the basis of metal oxides, are metal-coated, or are decorated with metal oxide nanoparticles. The individual preferred nanofiber materials are described later in more detail.

For producing nanofiber material on the basis of polymeric materials, it may be advantageous if the injection rate is in a range from about 2 µl/min to about 20 µl/min, in particular in a range from about 5 µl/min to about 18 µl/min.

In the case of nanofibers decorated with nanoparticles, the nanoparticles are arranged on the nanofibers and fixed thereto.

Metal oxide-based nanofibers, in particular titanium dioxide-based and cerium oxide-based nanofibers, or metal-coated nanofibers, in particular platinum-coated nanofibers, are preferably injected into an electric field at an injection rate in a range from about 400 µl/min to about 600 µl/min, in particular from about 450 µl/min to about 550 µl/min, for example about 500 µl/min.

The acceleration voltage between the nozzle and the counter electrode is preferably in a range from about 5 kV to about 30 kV, in particular in a range from about 10 kV to about 20 kV, for example in a range from about 12 kV to about 19 kV.

The distance between the nozzle and the counter electrode is, e.g., about 10 cm to about 20 cm. The diameter of the nozzle is preferably in a range from about 0.1 mm to about 1 mm.

The precursor solution for the electrospinning method to be used in accordance with the invention, which solution is injected through the nozzle into the electric field, preferably comprises one or more polymers, a solvent, and lithium chloride.

In embodiments in which nanofiber materials that contain nanoparticles are provided, the precursor solution, which is injected into the electric field, comprises nanoparticles in addition to the stated components.

For producing metal oxide-based nanofibers, the precursor solution preferably comprises, in addition to the stated components, a metal salt or a covalent or complex metal compound, which can be converted to the corresponding metal oxide. For example, an oxidation of metal nitrate to metal oxide is suitable for this.

The electrospinning method offers the advantage that the method is flexibly adjustable, such that different nanofiber materials can be obtained with the same apparatus. Only the acceleration voltage, the composition of the precursor solution, the injection rate, the distance between nozzle and counter electrode, and the diameter of the nozzle have to be adapted when nanofibers of different material are to be produced.

In accordance with a preferred embodiment, a needlefree electrospinning method is used for producing the nanofiber material.

Needlefree electrospinning methods are also referred to as "needleless" electrospinning methods.

The needlefree electrospinning method is preferably a variant of a static electrospinning method.

Preferred devices for performing a needlefree electrospinning method are available from the company ELMARCO S.R.O., 46001 Liberec XI, Czech Republic.

The devices are known, e.g., from WO 2008/028428 A1, WO 2008/011840 A2, and WO 2009/049565 A2.

Needlefree electrospinning methods have the advantage that needles of the electrodes (nozzles) do not clog, as occurs in conventional electrospinning methods. Thus, maintenance on the corresponding devices is necessary less frequently.

In one embodiment of a needlefree electrospinning method, provision may be made that the device comprises a rotating electrode, for example in the form of a metal cable. A counter electrode is moved relative to the rotating electrode. Nanofibers are formed at points of the rotating electrode at which the counter element gets close enough to the rotating electrode. The nanofibers hereby arise from a thin film of precursor solution, said film being formed on the surface of the rotating electrode and, in particular, being continuously refilled from a reservoir.

Acceleration voltages that are applied between the rotating electrode and the counter electrode are preferably about 1 kV or more and/or about 20 kV or less.

Alternatively to providing the nanofiber material by means of an electrospinning method, provision may be made that the nanofiber material is provided by means of a centrifugal spinning method.

Centrifugal spinning methods are known from the review Z. Zhiming et al., "Research on the development of the centrifugal spinning", MATEC Web of Conferences 95 (2017) 07003.

In a centrifugal spinning method, a precursor solution is injected through a nozzle rotating at a predetermined rotational speed, whereupon nanofibers are created due to centrifugal forces, said nanofibers being deposited on a substrate.

The rotational speed in the centrifugal spinning method in accordance with the invention is preferably in a range from about 10 revolutions/min to about 6000 revolutions/min.

The centrifugal spinning method offers the advantage that a structure of an apparatus for centrifugal spinning is very simple and comprises few components. Moreover, the method is robust against variations in the relative humidity in an environment in which the method is performed.

In accordance with a further alternative method of producing the nanofiber material, provision may be made that the nanofiber material is provided by means of a solution blow spinning method.

Solution blow spinning methods are known, e.g., from U.S. Pat. No. 8,641,960 B1.

In a solution blow spinning method, a precursor solution is introduced by an inner nozzle into a carrier gas stream. The carrier gas stream is introduced by an outer nozzle into a space in which the nanofibers are formed. Nanofibers are formed by selecting a suitable gas pressure of the carrier gas stream.

In the solution blow spinning method in accordance with the invention, the injection rate is preferably in a range from about 10 μl/min to about 30 μl/min. In particular, the injection rate is in a range from about 12 μl/min to about 22 μl/min, for example in a range from about 15 μl/min to about μl/min.

In particular, the gas pressure of the carrier gas stream in the solution blow spinning method is in a range from about 100 kPa to about 500 kPa.

The nanofiber material to be provided in accordance with the invention is preferably provided as a fibrous body. In particular, the nanofiber material is provided as a tangled mesh and/or as a non-woven fabric and/or a fiber mat.

The nanofiber material is provided, in particular, as a directed laid fabric.

The provision of the nanofiber material as a fibrous body facilitates the handling in the next stages of the method because the fibrous body can be handled as a whole, preferably by means of a gripping tool, in a laboratory scale, for example by means of forceps.

It may be favorable if the nanofiber material comprises nanofibers that have an average diameter of about 20 nm to about 3000 nm, preferably about 50 nm to about 700 nm.

The nanofiber material particularly preferably consists substantially of nanofibers that have an average diameter of about 20 nm to about 3000 nm, preferably about 50 nm to about 700 nm.

An average diameter of the nanofibers of the nanofiber material is preferably about 50 nm or more, in particular about 100 nm or more.

In particular, the average diameter of the nanofibers of the nanofiber material is about 3000 nm or less, for example about 700 nm or less.

An average diameter of the nanofibers of about 20 nm is often adequate to give the resulting composite layer a sufficient strength, while a diameter of about 3000 nm is still small enough so that the resulting nanorods after a comminution can be embedded into the ionomer component.

In accordance with a preferred embodiment, a ratio of the average diameter of the nanofibers of the nanofiber material to a thickness of the resulting composite layer is about 1/20 or less.

The average diameter of the nanofibers or the resulting nanorods after a comminution as well as an average length of the resulting nanorods after a comminution (which will be explained in more detail later) is determined according to a possible method on the basis of electron microscope images, in particular scanning electron microscopy images. The scanning electron microscopy images are evaluated with regard to the average diameter and/or the average length by means of an image processing program. The average diameter or the average length is then obtained by an algorithm from data acquired by means of the image processing program.

The average diameter and/or the average length are specified, in particular, as arithmetic means.

Average diameters and/or average lengths mentioned in the following are determined, as previously described, using scanning electron microscopy images.

An elemental composition of the nanofiber material is determined according to a possible method by means of X-ray spectroscopy, in particular by means of energy dispersive X-ray spectroscopy (EDX) and/or X-ray fluorescence (XRF).

Provision may be made that the nanofiber material is thermally post-treated before the comminution or the nanorods resulting from the comminution are thermally post-treated before the dispersion.

For this purpose, preferably the nanofiber material is sintered before the comminution or the nanorods are sintered before the dispersion.

For the thermal post-treatment, in particular the sintering, temperatures in a range from about 250° C. to about 1500° C., in particular 400° C. to about 600° C., have proven to be particularly advantageous.

For different aspects of the resulting composite layer like, e.g., a mechanical stability of the composite layer or a chemical resistance of the composite layer, different nanofiber materials are particularly suitable for the method in accordance with the invention.

The nanofiber material preferably comprises one or more of the following materials: oxides, preferably metal oxides, in particular cerium oxide and/or transition metal oxides, for example titanium dioxide and/or manganese oxide, and polymeric materials.

Depending on the nanofiber material that is embedded in comminuted form as nanorods in the composite layer, the resulting composite layers have different properties. The nanofiber material is selected depending on which property the resulting composite layer is to have.

Nanofibers on the basis of materials that have radical-scavenging properties are particularly suitable for nanofiber materials with increased chemical resistance of resulting composite layers. For example, the use of nanofibers that comprise cerium oxide or consist substantially of cerium oxide can increase the chemical resistance of resulting composite layers.

From the point of view of improving the mechanical properties of a resulting composite layer, hydrophobic polymers, in particular polytetrafluoroethylene (PTFE), polybenzimidazole (PBI), polyvinylidene fluoride (PVDF), polyetheretherketone (PEEK), polyolefins, in particular polyethylene (PE) and polypropylene (PP), have proven to be particularly advantageous material for nanofibers of the nanofiber material.

From the point of view of producing of ceramic nanofiber materials for improving the chemical and mechanical properties of resulting composite layers, hydrophilic polymers, in particular polyvinylpyrrolidone (PVP), have proven to be particular suitable materials for nanofibers of the nanofiber material. They are used, in particular, as carrier polymers and are oxidized in a thermal post-treatment step to carbon dioxide, nitrogen oxides and water and are thus removed due to the volatility or an evaporation of the oxidation products.

A material or a substance is referred to as "hydrophilic" if it is soluble in water at 25° C., is mixable with water, is moisture-absorbent, or more generally interacts with polar substances. In particular, a material or a substance is referred to as "hydrophilic" if the material or substance falls under the IUPAC definition for "hydrophilicity". According to the IUPAC definition, the hydrophilicity is a solvation tendency of a molecule in water.

A material or a substance is referred to as "hydrophobic" if it is not soluble in water at 25° C. and is not mixable with water. In particular, a material or a substance is referred to as "hydrophobic" if the material or substance falls under the IUPAC definition for "hydrophobicity". According to the IUPAC definition, the hydrophobicity is the combination of nonpolar groups or molecules in an aqueous environment which arises from the tendency of water to exclude nonpolar groups or molecules.

In particular, the nanofiber material comprises one or more conjugated polymers and/or one or more unconjugated polymers.

Preferred polymers of the ionomer component are specified later in more detail. However, at this point, the ionomer component should be characterized to the extent that it preferably comprises at least one polymer that has a polymer backbone. For example, the polymer backbone is formed of a carbon chain, which has fluorinated methylene groups or long-chain fluorinated carbon residues. The fluorinated methylene groups or long-chain carbon residues preferably enter into interaction with components of the nanofiber material.

Polymers that can interact with the polymer backbone of the ionomer component, for example by way of Van der Waals interaction or interactions by way of hydrogen bonds, are preferably used for the production of the nanofiber material.

The ionomer component preferably comprises at least one polymer that has one or more sulfonate functionalities. The sulfonate functionality/functionalities is/are, in particular, arranged on an end of a carbon side chain that branches off of the polymer backbone. In this variant of the ionomer component, it may be advantageous if the nanofiber material comprises one or more polymers, which can enter into interactions with the sulfonate functionality/functionalities of the ionomer component, for example by way of ionic interaction or interactions by way of hydrogen bonds. The perfluorinated copolymer available under the brand name Nafion® is a typical example for such ionomer components.

Moreover, preferably polymers which themselves have a thermally and/or chemically stable polymer backbone are used for the production of the nanofiber material. This can be advantageous for the proton conductivity or the anion conductivity of the resulting composite layer.

Further, it may be advantageous if the nanofiber material comprises one or more polymers that have a strong intermolecular interaction, for example by way of Van der Waals interactions or interactions by way of hydrogen bonds.

For the production of ceramic nanofibers for thermally and chemically reinforcing the resulting composite layer, preferably carrier polymers with a molecular weight in a range from about 300,000 g/mol to about 3,000,000 g/mol are used. Carrier polymers of that kind are suitable to form a homogenous dispersion or solution with substances that function as starting material for metal oxide-based nanofibers. Precursor solutions, comprising a carrier polymer and a starting material for metal oxide-based nanofibers, can, in particular, easily be processed to nanofibers.

The materials of the nanofibers of the nanofiber material are preferably selected according to which properties the resulting composite layer is to have.

A particularly high mechanical stability of a resulting composite layer is achieved, e.g., with PBI-based nanofibers.

A particularly high chemical stability of a resulting composite layer has been observed with cerium oxide-based nanofibers.

An optimized thermal stability of a resulting composite layer is preferably achieved with titanium dioxide-based nanofibers or with other metal oxide-based nanofibers.

Provision may be made that the nanofiber material comprises or substantially consists of coated nanofibers, preferably nanofibers coated with noble metal, in particular with platinum and/or with palladium.

In particular, a coating of the nanofibers can be produced by adding a corresponding starting material to the precursor solution of the electrospinning method. The production of nanofibers coated with noble metal is described later in more detail.

To optimize the chemical and/or thermal and/or mechanical stability of the nanofiber material and a resulting composite layer, provision may be made that the nanofiber material, optionally in the form of a fibrous body, is functionalized before the comminution—in particular with regard to the anion conductivity or proton conductivity of the resulting composite layer. This is described in the following by way of examples.

For this purpose, the nanofiber material, optionally in the form of a fibrous body, is preferably brought into contact with caustic soda or caustic potash or sulfuric acid or phosphoric acid or a metal salt solution.

In particular, the nanofiber material, optionally in the form of a fibrous body, is heated in caustic soda or caustic potash or sulfuric acid or phosphoric acid or in a metal salt solution.

In particular a platinum salt solution, a rhodium salt solution, a palladium salt solution, a ruthenium salt solution, or a mixed metal salt solution, for example a platinum cobalt salt solution or a platinum nickel salt solution or mixtures thereof are suitable as a metal salt solution.

By bringing the nanofiber material into contact with or heating the nanofiber material in caustic soda (sodium hydroxide solution) or in caustic potash (potassium hydroxide solution), in particular, an anion conductivity can be increased. This is advantageous for a use of the resulting composite layer in anion exchangers.

When bringing the nanofiber material into contact with and/or heating the nanofiber material in sulfuric acid, an interaction of the nanofiber material with sulfate groups of the sulfuric acid occurs, wherein the sulfate groups are at least partially physically or chemically bonded to surfaces of the nanofiber material.

When the nanofiber material is brought into contact with phosphoric acid and/or heated in phosphoric acid, an interaction of phosphate groups of the phosphoric acid and surfaces of the nanofiber material occurs, wherein phosphate groups, in particular, are physically or chemically bonded there.

As a result of the interaction with sulfate or phosphate groups, a proton conductivity of the nanofiber material and thus of the resulting composite layer can be increased.

When using mixed metal salt solutions, in particular, in a subsequent sintering step an alloy of different metals of the mixed metal salt, for example platinum nickel salt, can be created.

Metal ions of the metal salt solutions can, in particular, be ionically bonded to surfaces of the nanofiber material or form island structures on surfaces of the nanofiber material.

Alternatively to a functionalization of the nanofiber material, provision may be made that the nanorods created by comminuting the nanofiber material are functionalized. The preceding statements regarding the functionalization of the nanofiber material apply equally to the nanorods.

The nanofiber material is preferably provided—optionally in the form of a fibrous body—wherein the nanofiber material and/or the fibrous body comprises one or more additives. In particular, the one or more additives comprise a component of nanofibers of the nanofiber material. In particular, the one or more additives are applied to the nanofibers and/or the one or more additives are mixed with the nanofibers.

It may be favorable if one or at least one of the plurality of additives comprise functional nanoparticles in granular form and/or fiber form.

Functional particulate nanomaterial in granular form is referred to as nanoparticles.

The functional nanoparticles in granular form and/or fiber form preferably comprise platinum, palladium, platinum cobalt, zirconium phosphate, zeolite materials, silicon oxide and/or one or more metal oxides, in particular one or more metal oxides selected from cerium oxide and transition metal oxides, for example titanium oxide and/or manganese oxide.

Provision may be made that nanofibers of the nanofiber material are provided doped with a metal oxide, for example cerium oxide. For a doping with cerium oxide ($CeO_2$), for example, cerium nitrate-doped nanofibers are produced and/or provided, which in particular are then oxidized in air by a thermal post-treatment, in particular at about 400° C. to about 600° C., to form cerium oxide nanofibers. Here, a carrier polymer, for example PVP, is also oxidized, such that its volatile or vaporizable oxidation products (carbon dioxide, nitrogen oxides and water) can escape.

It may be advantageous if the nanofiber material is acted upon with mechanical energy upon and/or for the purpose of comminution, and if the nanofiber material is preferably comminuted by means of sonication and/or mechanical comminution. For mechanical comminution, the nanofiber material is preferably comminuted in a ball mill or a mortar. Provision may also be made that a plurality of the stated comminution variants are applied one after the other in order to obtain a particularly uniform comminution.

During the sonication, preferably an ultrasonic lance is used, which is operated, e.g., with a power of about 200 W to about 300 W, in particular with a power of about 250 W. In particular, an ultrasonic bath is set into ultrasonic vibration by the ultrasonic lance. A container is placed into the ultrasonic bath, into which container the nanofiber material and the liquid medium are added and which is subsequently treated with ultrasound. The liquid medium may be a dispersant for a nanorod dispersion that is created during the sonication.

In particular, the ultrasonic lance is operated with a power of about 0.1 W per ml of resulting nanorod dispersion to about 10 W per ml of resulting nanorod dispersion.

The nanorod material is preferably comminuted for about 1 h to about 3 h, for example about 2 h, in the ultrasonic bath while forming nanorods.

The ionomer component may be added to the remaining components of the liquid medium before or after the comminution of the nanofiber material.

In addition or alternatively to the comminution by the application of mechanical energy, the nanofiber material, depending on the material composition of the nanofiber material, is acted upon with thermal energy for the purpose of comminution.

For example, in the case of a nanofiber material, comprising or substantially consisting of titanium dioxide nanofibers or cerium nitrate nanofibers, a thermal energy may be sufficient in the previously described thermal post-treatment in order to comminute the nanofiber material to nanorods.

The thermal post-treatment is preferably performed at about 400° C. to about 600° C. for about 3 hours to about 9 hours. A thermal post-treatment at about 500° C. for about 6 hours is particularly preferable.

The thermal post-treatment preferably serves, as already mentioned, to remove a carrier polymer, the oxidation products of which are typically volatile or vaporizable (carbon dioxide, nitrogen oxides and water) and optionally to oxidize metal nitrate into the corresponding metal oxide (e.g., cerium nitration into cerium oxide) or, in the case of a metallic coating, to reduce a metal ion on the basis of oxidizing ligands bonded thereto (e.g., oxidation of acetylacetonate ligands of platinum acetylacetonate).

In the case of comminution by the application of thermal energy, the resulting nanorods are dispersed in the liquid medium (with or without an ionomer component). The addition of the ionomer component may take place before, during, or after the dispersion of the nanorods.

The liquid medium preferably comprises one or more of the following materials: fluorinated copolymers with sulfonic acid groups, in particular Nafion®, Aciplex®, Aquivion®, 3M® PFSA (Perfluorosulfonic Acid), Fumion®, and non-fluorinated polymers, in particular hexamethyl-p-terphenyl-poly(benzimidazole), polysulfones, for example polyarylethersulfones, ethylene-tetrafluoroethylene-copolymers and polyetheretherketone (PEEK).

The aforementioned materials or material combinations preferably form the ionomer component. The ionomer component preferably serves to provide or increase the proton conductivity or anion conductivity.

Nanorods with defined dimensions can be obtained through the comminution.

An aspect ratio of the nanorods of average length to average diameter is preferably in a range from about 5 to about 25000, in particular in a range from about 10 to about 500.

The nanorods preferably have an average length of about 2 μm to about 500 μm, in particular from about 5 μm to about 30 μm.

The aspect ratio and the average length are preferably determined according to the previously described process using images taken with a scanning electron microscope.

After the nanorod ionomer dispersion has been produced in accordance with the previously described preferred variants, said dispersion is, as already mentioned, applied to the surface region of the substrate.

The application of the nanorod ionomer dispersion is preferably effected by one or more of the following methods that are known per se:

drop-casting, print-coating methods, in particular doctor-blading, screen printing, slit printing, engraving, inkjet printing, and spray coating methods.

During the application, different aspects may play a role.

A varying composition of the resulting composite layer in a direction perpendicular to a longitudinal center plane of the composite layer may be advantageous. In one use of the composite layer in a membrane of a fuel cell, for example, a different composition of the composite layer on an anode side and on a cathode side of the fuel cell may be advantageous.

For a variation of the composition of the resulting composite layer in a direction perpendicular to the longitudinal center plane, it may be advantageous if the nanorod ionomer dispersion is applied in a plurality of layers and, in particular, for producing the plurality of layers, in each case nanorod ionomer dispersions with different compositions are used.

Alternatively to a multi-layer application of the nanorod ionomer dispersion, the nanorod ionomer dispersion may be applied to the surface region in one layer. This has the advantage that only one single application step is necessary. For the single-layer application, doctor blading, also referred in German as "Rakelbeschichtung", is particularly suitable. By doctor blading the nanorod ionomer dispersion, a composite layer with a uniform total thickness can be reproducibly created.

By applying the nanorod ionomer dispersion is a plurality of layers, for example, a composite layer can be formed that has a variation in a nanorod concentration, for example a concentration gradient, in a direction perpendicular to the longitudinal center plane of the composite layer.

For this purpose, in particular, a plurality of layers of different nanorod ionomer dispersions with different nanorod concentrations are applied sequentially to the surface region of the substrate or to a previously applied layer. In a concentration gradient in the resulting composite layer, a nanorod concentration of the nanorod ionomer dispersion increases or decreases from layer to layer.

For the multi-layer application of the nanorod ionomer dispersion, spray coating is particularly suitable, because it is easily possible to change a liquid to be sprayed in a corresponding apparatus.

Alternatively to the concentration gradient of nanorods in the resulting composite layer, an intermediate layer in the resulting composite layer can be formed in a targeted manner by applying nanorod ionomer dispersions of different compositions in a plurality of layers. The intermediate layer then preferably has a different composition than the rest of the composite layer.

The nanorods are preferably contained in the nanorod ionomer dispersion with a share of about 1% by weight to about 50% by weight, in particular about 2% by weight to about 40% by weight, for example about 5% by weight to about 35% by weight, in each case based on the total weight of the dispersion.

It has proven to be particularly advantageous for the electrochemical properties, in particular with regard to the proton conductivity or the anion conductivity, of the composite layer if a non-ionomer share of the composite layer is in a range from about 5% by weight to about 20% by weight. The non-ionomer share comprises all components of the composite layer except for the ionomer component.

The ionomer component is contained in the composite layer preferably with a share of about 80% by weight to about 95% by weight based on the total weight of the composite layer. This enables a sufficiently high proton conductivity or anion conductivity through the composite layer by way of the ionomer component.

Whether the proton conductivity or the anion conductivity is increased depends on a selection of the ionomer component. This is described later in more detail.

The composite layer preferably has a total thickness in a range from about 1 μm to about 100 μm, in particular in a range from about 2 μm to about 80 μm.

Composite layers with a total thickness in a range from about 5 μm to about 25 μm have proven to be particularly advantageous for use in fuel cells in vehicles. For fuel cells in a passenger vehicle, preferably composite layers with a total thickness in a range from about 5 μm to about 10 μm are used. For fuel cells in a truck, preferably composite layers with a total thickness in a range from about 20 μm to about 25 μm are used.

For a use of the composite layer in electrolytic cells, a total thickness of the composite layer is preferably selected in a range from about 20 μm to about 80 μm, in particular in a range from about 40 μm to about 80 μm.

For redox flow cells, composite layers with a total thickness in a range from about 20 μm to about 50 μm have proven to be particularly advantageous.

For increasing the mechanical stability and/or for increasing a proton conductivity or anion conductivity, provision may be made that the composite layer and/or the components thereof are crosslinked.

Provision may be made that molecules of different nanorods within the composite layer bond with one another and the respective nanorods are thus crosslinked.

A crosslinking of PBI-based nanorods can take place, e.g., by thermal methods or chemical methods, for example a reaction with a base.

Preferably one or more crosslinking agents are used, which connect contact points of two nanorods together.

The crosslinking takes place, e.g., according to the following reaction:

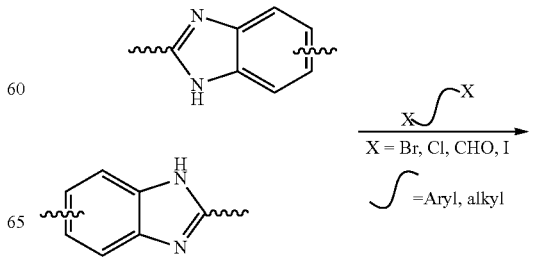

-continued

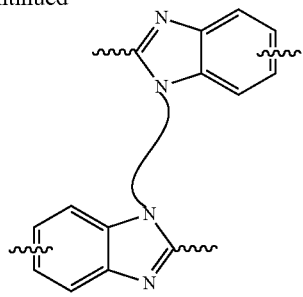

wherein the curved line represents an acrylic functionality or an alkyl chain and wherein X is one of the following residues: —Br, —Cl, —CHO, —I.

A crosslinking of PVDF-based nanorods may take place, e.g., according to the following reaction:

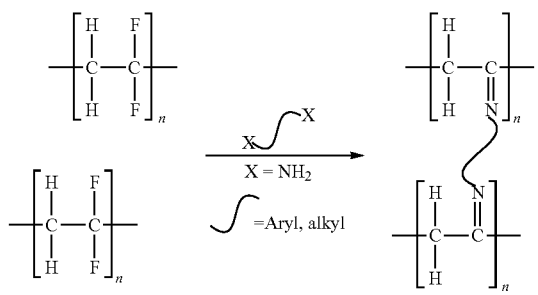

wherein the curved line represents an acrylic functionality or an alkyl chain and wherein X is one of the following residues: —Br, —Cl, —CHO, —I.

The two polymer sections depicted in the examples hereby each belong to two different nanorods. An activation of X may be effected thermally and/or base-induced.

As previously shown by way of examples, preferably a polymer molecule of a nanorod in the composite layer is connected to a polymer molecule of an adjacent nanorod at the contact point. The connection is preferably effected by way of a molecule that has at least two functional groups, which react with a functionality of the corresponding nanorods. The molecule, in particular, is a crosslinking molecule.

For example, an electrophilic or a nucleophilic substitution reaction takes place to connect two or more nanorods.

In addition or alternatively to a crosslinking of different nanorods, provision may be made that a polymer molecule of the ionomer component chemically bonds with a polymer molecule of one or more nanorods within the composite layer, for example indirectly by way of a crosslinking agent, thus creating a crosslinking of different nanorods.

The crosslinking is preferably performed by treatment with electromagnetic radiation in the ultraviolet region and/or by chemical methods, in particular by ionic or covalent crosslinking, and/or by thermal methods.

For forming the crosslinking of two or more nanorods at contact points of said nanorods by means of (photo)chemical and/or thermal methods, as already explained by way of the examples, preferably one or more crosslinking agents, which are able to react with a polymeric material of the respective nanorods that result after comminution, for example, are added as a component to the precursor solution before an electrospinning method. The one or more crosslinking agents is/are then a component of the nanofibers of the nanofiber material that are produced by means of the electrospinning method.

After comminuting the nanofiber material, which contains the one or more crosslinking agents, the one or more crosslinking agents are then, in particular without further action, a component of the resulting nanorods. The one or more crosslinking agents can then be photochemically and/or thermally activated after formation of the composite layer. Then, for example, a reaction according to the preceding examples occurs (in the case of PBI-based nanorods or PVDF-based nanorods).

Alternatively, after formation of the composite layer, the one or more crosslinking agents are brought to reaction with the nanorods by means of dipping the composite layer in a crosslinking agent solution.

In accordance with a further alternative, the crosslinking agent is added during the application of the nanorod ionomer dispersion and thus during the formation of the composite layer creates a crosslinking of the nanorods with one another and/or of the nanorods with polymer molecules of the ionomer component.

For example, di-, tri-, or polyamines, in particular primary diamines, are suitable as a crosslinking agent for the crosslinking of PVDF-based nanorods.

For example, dialdehydes, in particular glutaraldehyde, dichloro compounds, or dibromo compounds, in particular (a, a')-dibromo-para-xylene, or diiodine compounds, in particular diiodooctane, are suitable as a crosslinking agent for the crosslinking of PBI-based nanorods.

Diamino compounds may also be used as a crosslinking agent.

The surface region of the substrate on which the composite layer is applied is preferably a surface region of an electrode or of a carrier, in particular a carrier film. In particular, the surface region comprises carbon and/or metal or is substantially formed therefrom.

Provision may be made that the composite layer is detached from the surface region and/or is handled as a separate element. This facilitates a so-called roll-to-roll production of at least a part of an electrochemical unit. Catalyst layers, as are used, e.g., in a fuel cell, are preferably also applied in the so-called roll-to-roll production.

Alternatively, composite layers in accordance with the invention may also be applied in electrolytic cells in a so-called roll-to-roll method.

In the following, various preferred variants for assembling an electrochemical unit are described as examples on the basis of a fuel cell.

The term "assembly" is to be understood as a putting together or layering of the individual constituent parts of the electrochemical unit.

The assembly is, with respect to the composite layer, possible in a one-sided manner, i.e., from one side of the composite layer from bottom to top, or in a two-sided manner, wherein in the two-sided assembly material/layers are applied from both sides of the composite layer. The assembly is also part of the invention.

Analogously, one-sided or two-sided assemblies of electrolytic cells, redox flow cells, and ion exchangers are performable.

In accordance with a preferred variant of the assembly of a fuel cell, the composite layer is applied directly to an electrode of the fuel cell. In the case of a fuel cell, catalyst layers of the fuel cell form the electrodes. The catalyst layers are preferably arranged, in particular fixed in a force-locking manner, between gas diffusion layers. The composite layer is located between the catalyst layers and/or the composite layer is arranged, in particular in a force-locking manner, between the catalyst layers.

Carbon substrates, comprising a gas diffusion layer, have proven to be particularly suitable for use in fuel cells in vehicles. The gas diffusion layer is preferably of the non-woven type.

The hydrophobizing of the gas diffusion layer is effected preferably by means of a hydrophobic polymer, for example PTFE. Carbon fibers contained in the gas diffusion layer are preferably covered with a microporous layer. A thickness of the microporous layer perpendicular to a longitudinal center plane of the composite layer is preferably in a range from about 5 µm to about 80 µm. In particular, the microporous layer comprises about 5% by weight to about 40% by weight polymer, for example PTFE, as a binder.

According to a two-sided assembly of an electrochemical unit, a composite layer is applied to a first electrode and a further composite layer is applied to a second electrode. The first and second electrodes are then connected to one another, in particular in such a way that the composite layer and the further composite layer directly abut on one another.

Alternatively, a one-sided assembly of an electrochemical unit is possible, in particular starting from an anode side of the electrochemical unit. The one-sided assembly facilitates the production and can be used in a so-called roll-to-roll method. A plurality of components of the electrochemical unit may also each be applied in a so-called roll-to-roll method.

In embodiments in which the electrochemical unit is a fuel cell, for example, in a first roll-to-roll method a first catalyst layer can be applied to a first gas diffusion layer. In a second so-called roll-to-roll method, a composite layer is applied. Particularly preferably, a second catalyst layer and a second gas diffusion layer can be applied in further so-called roll-to-roll methods.

After the previously described assembly, a resulting arrangement is preferably held in a force-locking manner between a first bipolar plate and a second bipolar plate of the fuel cell.

For this purpose, provision may be made that a film, in particular a so-called sacrificial film, is used, wherein, in particular, a catalyst layer is deposited on a carrier film.

Then, in particular, the composite layer is applied to the carrier film with the catalyst layer. In particular, a further catalyst layer is applied to and/or deposited on the composite layer. This results in an assembly (so-called "catalyst coated membrane"), which, according to a preferred embodiment, is arranged between two substrates, preferably two previously described gas diffusion layers, in particular each provided with a microporous layer.

Alternatively to the use of the carrier film, for the one-sided assembly of the fuel cell, the composite layer may be applied directly, as in the two-sided assembly, to the electrode. The electrode function is provided, in particular, by a first catalyst layer, which has optionally been applied to a first microporous layer and to a first gas diffusion layer.

The composite layer is subsequently applied to a second catalyst layer. Optionally a second microporous layer and a second gas diffusion layer are applied to the second catalyst layer.

In accordance with a further preferred two-sided alternative for assembling an electrochemical unit, provision may be made that the composite layer is formed on a carrier film, the carrier film is removed, and the composite layer is then positioned between a first catalyst layer and a second catalyst layer. The first catalyst layer and the second catalyst layer are preferably arranged on a first gas diffusion layer and a second gas diffusion layer, respectively. Provision may be made that the gas diffusion layers are also arranged on carrier films, which are removed before the fixing in a force-locking manner between bipolar plates.

Then a respective first gas diffusion layer and a respective second gas diffusion layer are arranged on surfaces of the first catalyst layer and the second catalyst layer that face away from the composite layer. The first gas diffusion layer and the second gas diffusion layer are optionally each provided with a microporous layer.

In all previously described variants for assembly, in an assembled state of the electrochemical unit, a respective bipolar plate is preferably arranged on surfaces of the first and second gas diffusion layer that face away from the composite layer.

The assembly can preferably take place in a so-called roll-to-roll method.

The nanorods are preferably distributed homogenously in the resulting composite layer. In particular, the nanorods are distributed isotropically in all spatial directions of the composite layer.

Further, the present invention relates to an electrochemical unit, comprising a composite layer, wherein the composite layer is produced according to a method in accordance with the invention.

The advantages and/or features mentioned with regard to the method in accordance with the invention apply equally to the electrochemical unit.

Further, the present invention relates to the use of the composite layer in accordance with the invention in a fuel cell, in particular a hydrogen fuel cell or a direct alcohol fuel cell, in a redox flow cell, in an electrolytic cell, or in an ion exchanger.

An ion exchanger may be an anion exchanger or a cation exchanger.

The features and/or advantages mentioned with regard to the method in accordance with the invention apply equally to the use of the composite layer in accordance with the invention.

The invention relates, moreover, to the use of the composite layer in accordance with the invention for anion conduction or for cation conduction.

The features and/or advantages mentioned with regard to the method in accordance with the invention apply equally to the further use of the composite layer in accordance with the invention.

Further preferred features and/or advantages of the invention are the subject matter of the subsequent description and the illustrative depiction of embodiments.

DETAILED DESCRIPTION OF THE DRAWINGS

Figure 1:
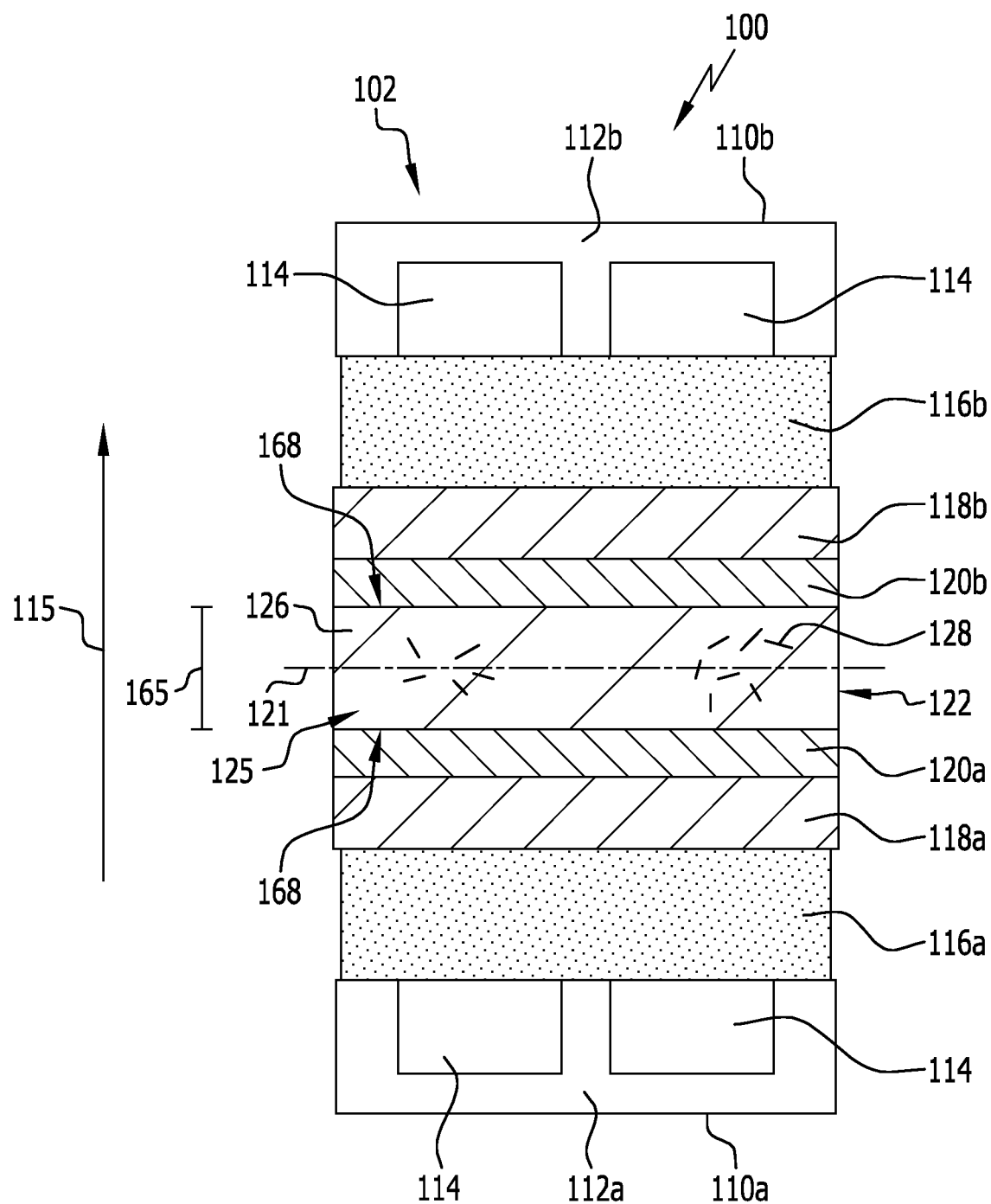
FIG. 1 shows a schematic depiction of an embodiment of an electrochemical unit.

An electrochemical unit 100 in the form of a fuel cell 102 is schematically depicted in FIG. 1. The fuel cell 102 serves to convert chemical reaction energy, which arises in a reaction of a fuel with an oxidizing agent, into electrical energy. In particular hydrogen, alcohol, for example methanol, butane or natural gas, are suitable as fuels.

The present fuel cell is a polymer electrolyte fuel cell, which is a low temperature fuel cell and is typically operated at an operating temperature of about 60° C. to about 120° C.

Preferably a plurality of fuel cells 102 are connected in series and form a so-called stack.

The fuel cell 102 comprises a first electrode plate 110a, which is configured as a first bipolar plate 112a, and a second electrode plate 110b, which is configured as a second bipolar plate 112b. Graphite materials or metallic materials have proven to be particularly preferable as materials for the bipolar plates 112a, 112b. Bipolar plates 112a, 112b made of graphite materials are less susceptible to corrosion than metallic materials, but bipolar plates 112a, 112b made of metallic materials, on the other hand, are more economic and therefore more suitable for industrial applications.

A high degree of efficiency is achieved by a coating of the electrode plates 110a, 112b with a catalyst, for example with platinum or palladium.

Arranged within the bipolar plates 112a, 112b are gas channels 114, presently arranged in parallel to one another, which serve to distribute supplied fuel in the form of a gas. The internal diameter of the gas channels 114 in each case is in a range from about 0.5 mm to about 1.5 mm, preferably about 1 mm.

The first electrode plate 110a and the second electrode plate 110b delimit the fuel cell 102 along a proton conduction direction 115.

Arranged between the first electrode plate 110a and the second electrode plate 110b, seen in the proton conduction direction 115, are a first gas diffusion layer 116a, a first microporous layer 118a, a first catalyst layer 120a, a membrane 122, a second catalyst layer 120b, a second microporous layer 118b, and a second gas diffusion layer 116b.

One or more of the stated layers may each be of multi-layer construction.

The fuel cell 102 is formed mirror-symmetrical in relation to a symmetry plane formed by the longitudinal center plane 121 of the membrane 122.

The first gas diffusion layer 116a and the second gas diffusion layer 116b presently have a thickness of about 1 µm to about 100 µm and are determinable by means of X-ray diffractometry. The gas diffusion layers 116a, 116b are presently made of carbon fibers (non-woven) that have been hydrophobized with PTFE.

For example, gas diffusion layers 116a, 116b of non-woven carbon fibers may be used (so-called carbon papers, available as a gas diffusion layer according to one of the series H14C, H15C, H23C and H24C from the Freudenberg Group, as Sigracet® BC 22, BC 25, BC 29 from SGL Carbon SE, as GDS1120, GDS2120, GDS22100, GDS2240, GDS2230, GDS3250, GDS3260, GDS3215 and MB30 from AvCarb®, and as Toray Paper from Toray Industries), for example with a share of 5% by weight polytetrafluoroethylene (PTFE).

In accordance with a preferred embodiment, the gas diffusion layers 116a, 116b are provided with a microporous carbon coating. Said microporous carbon coatings form the first microporous layer 118a and the second microporous layer 118b.

The gas diffusion layers 116a, 116b act as a diffusor for gases that reach the catalyst layers 120a, 120b. Moreover, the first and second gas diffusion layers 116a, 116b conduct electrons. Furthermore, the gas diffusion layers 116a, 116b may serve to transfer generated heat to a coolant (not depicted).

Provision may be made that for simplified gas transport, the first and second gas diffusion layer 116a, 116b each consist substantially of layers of platelet-shaped elements, which form a disordered structure.

The first microporous layer 118a and the second microporous layer 118b presently each have a thickness of about 5 µm to about 80 µm and can be characterized by X-ray diffractometry. They serve to transport reactants of the electrochemical reaction.

The microporous layers 118a, 118b presently each comprise about 5% by weight to about 40% by weight PTFE. The first microporous layer 118a and the second microporous layer 118b are presently formed of carbon nanoparticles and the binder.

Alternatively, the microporous layers 118a, 118b may also formed with a smaller share of PTFE or consist exclusively of carbon nanoparticles.

The microporous layers 118a, 118b are optional and the fuel cell 102 may also be formed without microporous layers 118a, 118b.

The catalyst layers 120a, 120b comprise materials for increasing the electrical conductivity (presently so-called carbon black nanoparticles), materials for providing a proton conductivity (presently ionomer materials), and materials that act catalytically (presently platinum nanoparticles).

Cations formed in the electrochemical reaction (protons in the case of a hydrogen fuel cell) travel during an operation of the fuel cell 102 from a cathode to an anode along a proton conduction direction 115.

The cathode and the anode each form an electrode. The anode at which hydrogen is oxidized is presently formed by the first catalyst layer 120a.

The cathode at which oxygen is reduced is presently formed by the second catalyst layer 120b.

The membrane 122 arranged between the electrodes serves for proton conduction in the proton conduction direction 115. The membrane 122 is presently formed by a composite layer 125 produced in accordance with the invention. Alternatively, provision may be made that the membrane 122 comprises further layers in addition to the composite layer 125.

A total thickness 165 of the composite layer 125 perpendicular to the longitudinal center plane 121 is presently about 5 µm to about 25 µm.

The composite layer 125 presently comprises an ionomer material 126 in which nanorods 128 (schematically indicated) are embedded for mechanical reinforcement and influencing proton conductivity and/or anion conductivity. The ionomer material 126 is formed by an ionomer component used for production, which will be explained later.

The composite layer 125 may be of homogenous construction in the proton conduction direction 115 or comprise a plurality of layers, which are arranged one behind the other in the proton conduction direction 115. This is explained later in more detail.

Figure 2:
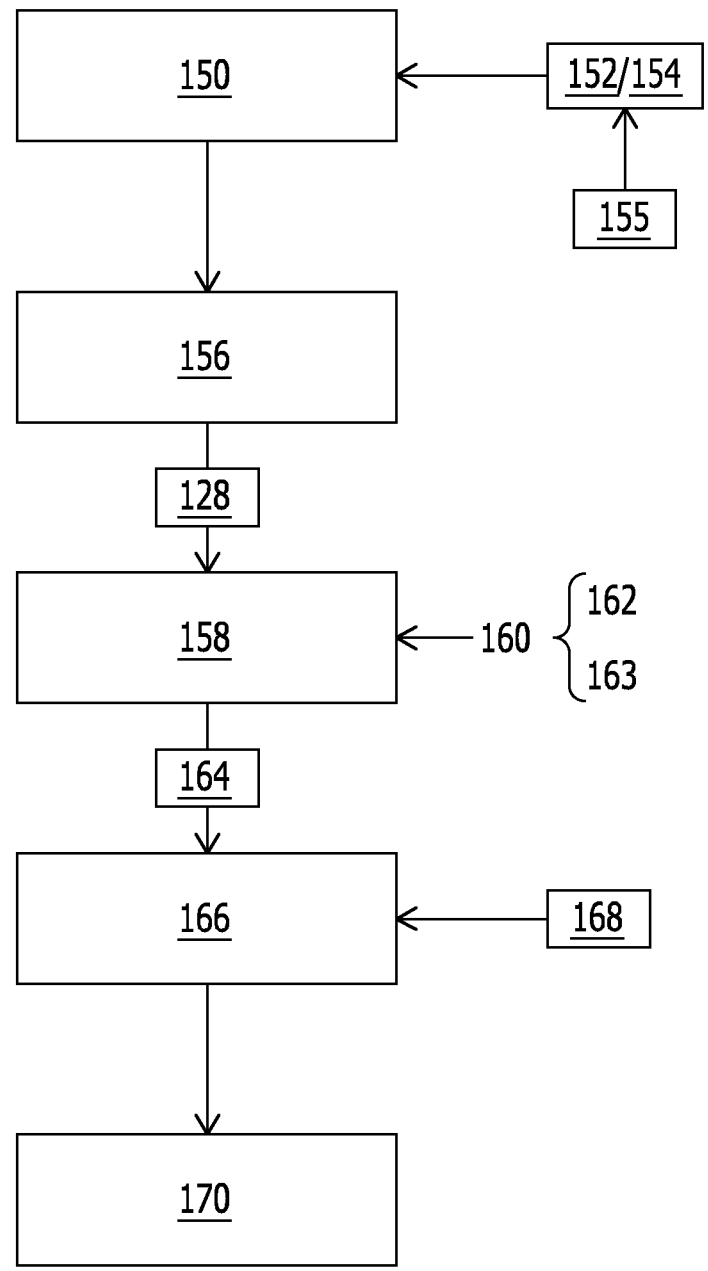
FIG. 2 shows a schematic flow chart of an embodiment of a method for producing a composite layer produced in accordance with the invention.

An embodiment of a method in accordance with the invention for producing the composite layer 125 is shown in the flow chart depicted in FIG. 2.

In accordance with a first method step 150, a nanofiber material 152 is provided.

In accordance with a preferred embodiment, the nanofiber material 152 is produced in an electrospinning method. Here, a precursor solution is injected while applying an acceleration voltage in a range from about 5 kV to about 30 kV at an injection rate of about 0.1 µl/min to about 600 µl/min.

A needlefree electrospinning method is preferably used. In the use of a needlefree (also called "needleless") electrospinning method, preferably nanofiber material 152 is produced from a free, in particular thin, film of a precursor solution on an electrode while applying a high voltage between the electrode and a counter electrode.

Preferred devices for performing a needlefree electrospinning method are available from the company ELMARCO S.R.O., 46001 Liberec XI, Czech Republic. For example, one of the products NS 8S1600U, NS 4S1000U, NS 1S500U, NS AC150, NS AC1000 or NS AC2000 from the company ELMARCO is used for the needlefree electrospinning method.

The nanofiber material 152 comprises nanofibers or consists substantially of nanofibers. The nanofibers preferably comprise oxides, in particular transition metal oxides, or oxides of rare earth, in particular cerium oxide.

Alternatively, the nanofibers are formed substantially of oxides, in particular of transition metal oxides, or oxides of rare earth, in particular cerium oxide.

Titanium dioxide and manganese oxide have proven to be particular suitable as transition metal oxides.

The nanofiber material 152 may also comprise or consist substantially of nanofibers of non-metal oxides.

In addition or alternatively to oxides, the nanofiber material 152 comprises nanofibers of polymeric materials or is formed substantially thereof.

For mechanically stabilizing the resulting composite layer 125, preferably nanofibers, comprising hydrophobic polymers, are used in the nanofiber material 152, in particular nanofibers of one or more of the following polymers: polytetrafluoroethylene (PTFE), polyvinylidene fluoride (PVDF), polybenzimidazole (PBI), polyolefins, for example polyethylene (PE) and polypropylene (PP), and/or polyetheretherketone (PEEK).

Preferably nanofibers comprising hydrophilic polymers, in particular nanofibers comprising polyvinylidene pyrrolidone (PVP), are used supportively in the nanofiber material 152 in the production of ceramic nanofibers.

The nanofiber material 152 may be optimized through the addition of additives 155 for adapting electrical, optical, or thermal properties. For this purpose, preferably one or more additives 155 are introduced into nanofibers of the nanofiber material 152, applied to nanofibers, or mixed with the nanofibers.

Functional particular nanomaterial in granular form, in particular functional nanoparticles, preferably metal nanoparticles or metal oxide nanoparticles, in particular transition metal oxide nanoparticles or nanoparticles of oxides of rare earth are suitable as additives 155.

One or more of the following functional nanoparticles have proven to be particularly suitable: palladium nanoparticles, platinum nanoparticles, platinum cobalt nanoparticles, zirconium phosphate nanoparticles, zeolite nanoparticles, silicon oxide nanoparticles, titanium dioxide nanoparticles, manganese oxide nanoparticles, and cerium oxide nanoparticles.

In addition or alternatively to functional particulate nanomaterial in granular form, in particular in the form of nanoparticles, functional particulate nanomaterial in fiber form is a suitable additive 155. Here, nanoparticles in fiber form made from materials that were described with regard to the functional nanoparticles in granular form are suitable.

Provision may be made that the nanofiber material 152 comprises nanofibers coated with platinum or palladium or consists substantially of nanofibers coated with platinum or palladium. The coating serves to react hydrogen and oxygen, which parasitically diffuse through the composite layer 125 before the hydrogen or oxygen reach an opposing electrode (first catalyst layer 120a or second catalyst layer 120b).

The nanofiber material 152 provided for the production of the composite layer 125 is preferably provided in the form of a fibrous body 154. Nanofibers of the nanofiber material 152 form, e.g., a fiber mat, a tangled mesh, or a non-woven fabric. This depends on the production of the nanofiber materials 152.

In the case of the production of the nanofiber material 152 by means of an electrospinning method, the nanofiber material 152 is provided as a fibrous body 154 configured as a tangled mesh or as a fiber mat.

Alternatively to the electrospinning method, the nanofiber material 152 may also be provided by means of a centrifugal spinning method or by means of a solution blow spinning method.

A rotational speed in the centrifugal spinning method is preferably about 10 revolutions/min to about 6000 revolutions/min.

In a solution blow spinning method, an injection rate is preferably selected in a range from about 10 µl/min to about 30 µl/min and a carrier gas stream is set to a pressure of about 100 mPa to about 500 kPa.

Provision may be made that the nanofiber material 152 is thermally post-treated, in particular sintered, before it is subjected to further processing. Water can thus be removed or an oxidation performed, for example from cerium nitrate to cerium oxide.

The nanofiber material 152, presently the fibrous body 154, is functionalized by bringing the nanofiber material 152 into contact with and/or heating the nanofiber material 152 in sulfuric acid or phosphoric acid or by bringing the nanofiber material 152 into contact with and/or heating the nanofiber material 152 in a metal salt solution. In the case of bringing the nanofiber material 152 into contact with and/or heating the nanofiber material 152 in sulfuric acid or phosphoric acid, here, sulfate groups and phosphate groups, respectively, are bonded to surfaces of the nanofiber material 152, thereby increasing a proton conductivity of the resulting composite layer 125.

In the case of bringing the nanofiber material 152 into contact with and/or heating the nanofiber material 152 in a metal salt solution, metal ions are bonded to and/or metal islands are formed on a surface of the nanofiber material 152, thereby optimizing conductivity properties of the material.

Platinum salt solutions, rhodium salt solutions, palladium salt solutions, ruthenium salt solutions, or mixed metal salt solutions, for example platinum cobalt salt solutions or platinum nickel salt solutions, have proven to be particularly suitable as metal salt solutions.

Alternatively, provision may be made that the nanofiber material 152, presently the fibrous body 154, is brought into contact with and/or heated in caustic potash or caustic soda, thereby increasing an anion conductivity of the resulting composite layer 125. During the functionalization, protons are preferably bonded to surfaces of the nanofiber material 152 by hydroxide ions of the caustic potash or caustic soda, resulting in positive charges on surfaces of the nanofiber material 152.

In accordance with an alternative mechanism in composite layers 125 that function as anion exchangers, hydroxide ions are covalently or ionically bonded to polymer molecules of the ionomer component 162. The bonded hydroxide ions thus displace further anions and thereby increase a hydroxide conductivity of the composite layer 125.

In a second method step 156, the nanofiber material 152 is comminuted. For this purpose, the nanofiber material 152 is acted upon with mechanical energy. The energy required for comminution is preferably introduced by sonication of the nanofiber material 152. In addition or alternatively, the nanofiber material 152 is mechanically comminuted in a mortar and/or a ball mill.

Depending on the material composition of the nanofiber material 152, a comminution may also be effected during and by means of the previously mentioned thermal post-treatment. This is described for example in the context of Embodiments 7 and 8.

Upon comminuting the nanofiber material 152, nanorods 128 are formed from the nanofiber material 152, the nanofibers of the nanofiber material 152 being separated in the longitudinal direction. The average diameter of the nanofibers remains unchanged upon being comminuted to nanorods 128.

The nanorods 128 have an average diameter of about 20 nm to about 3000 nm, preferably an average diameter of about 50 nm to about 700 nm.

An average length of the nanorods 128 is about 2 μm to about 500 μm, preferably about 5 μm to about 30 μm.

A preferred aspect ratio of the nanorods 128 is in a range from about 5 to 25000, particularly preferably in a range from about 10 to about 500.

The average diameter, the average length, and the aspect ratio are determined from scanning electron microscopy images.

As already described for nanofibers, provision may be made that the nanorods 128 are thermally post-treated, in particular sintered, before further processing. This can serve for the removal of water or for oxidation, for example of cerium nitrate to cerium oxide.

Suitable temperatures for the thermal post-treatment are in a range from about 400° C. to about 600° C.

In place of the nanofiber material 152, as described with regard to the first method step 150, the nanorods 128 that result from the comminution of the nanofiber material 152 may also be functionalized. In this regard, reference is made to the statements on the functionalization of nanofiber material 152. The functionalization may be performed analogously for the nanorods 128.

In a third method step 158, the nanorods 128 are dispersed in a liquid medium 160, the liquid medium 160 being previously provided. The liquid medium 160 comprises an ionomer component 162 and a dispersant 163.

Preferred dispersants 163 are alcohols, alcohol mixtures, and alcohol-water mixtures. Methanol, ethanol, 2-propanol, or 1-butanol or mixtures of said alcohols are particularly preferable. Alternatively, mixtures of said alcohols with water may be used as a dispersant 163.

The ionomer component 162 is selected according to the properties of the composite layer 125 that are to be obtained.

For an optimized proton exchange within the resulting composite layer 125, fluorinated copolymers with sulfonic acid groups, in particular polyfluorinated copolymers with sulfonic acid groups or perfluorinated copolymers with sulfonic acid groups, or mixtures thereof are particularly suitable as an ionomer component 162.

For example, particularly good properties with respect to proton exchange have been achieved with each of the products that at the date of filing of the application were sold under the names Nafion®, Aciplex®, 3M® PFSA (Perfluorosulfonic Acid), Fumion® and Aquivion®, as an ionomer component 162. Nafion® is available from DuPont (E. I. du Pont de Nemours and Company). Aciplex® is available from Asahi Kasei K.K. 3M® PSFA is available from 3M Company. Fumion® is available from Fumatech GmbH. Aquivion® is available from Solvay S.A.

Alternatively, an anion exchange in the resulting composite layer 125 can also be improved with appropriate selection of the ionomer component 162. This is of particular importance in a use of the resulting composite layer 125 in anion exchangers. For this purpose, the ionomer component 162 preferably comprises one or more non-fluorinated polymers or consists substantially of one or more non-fluorinated polymers.

Preferred non-fluorinated polymers are: in particular hexamethyl-p-terphenyl-poly(benzimidazole), polysulfones, for example polyarylethersulfones, ethylene tetrafluoroethylene copolymers and polyetheretherketone (PEEK).

By dispersing the nanorods 128 in the dispersant 163 and adding the ionomer component 162 before or after dispersing the nanorods 128 in the dispersant 163, a nanorod ionomer dispersion 164 is created.

Here, a share of the nanorods 128 in the nanorod ionomer dispersion 164 is about 1% by weight to about 50% by weight based on the total weight of the dispersion.

In a fourth method step 166, the nanorod ionomer dispersion 164 is applied to a surface region 168 of a substrate 169.

In the embodiment depicted in FIG. 1, the surface region 168 of the substrate 169 is a surface region of the first catalyst layer 120a and/or a surface region of the respective electrode, or more precisely a surface region of the first catalyst layer 120a and/or of the second catalyst layer 120b.

Figure 3:
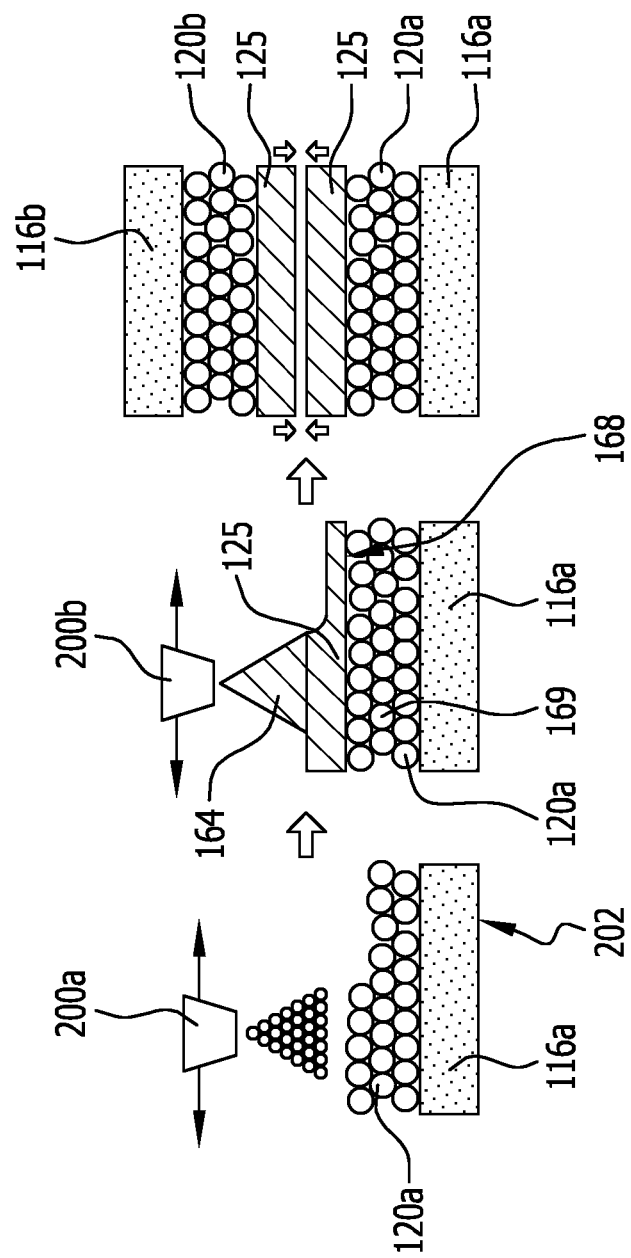
FIG. 3 shows a schematic depiction of a variant of an assembly of a fuel cell.
Figure 4:
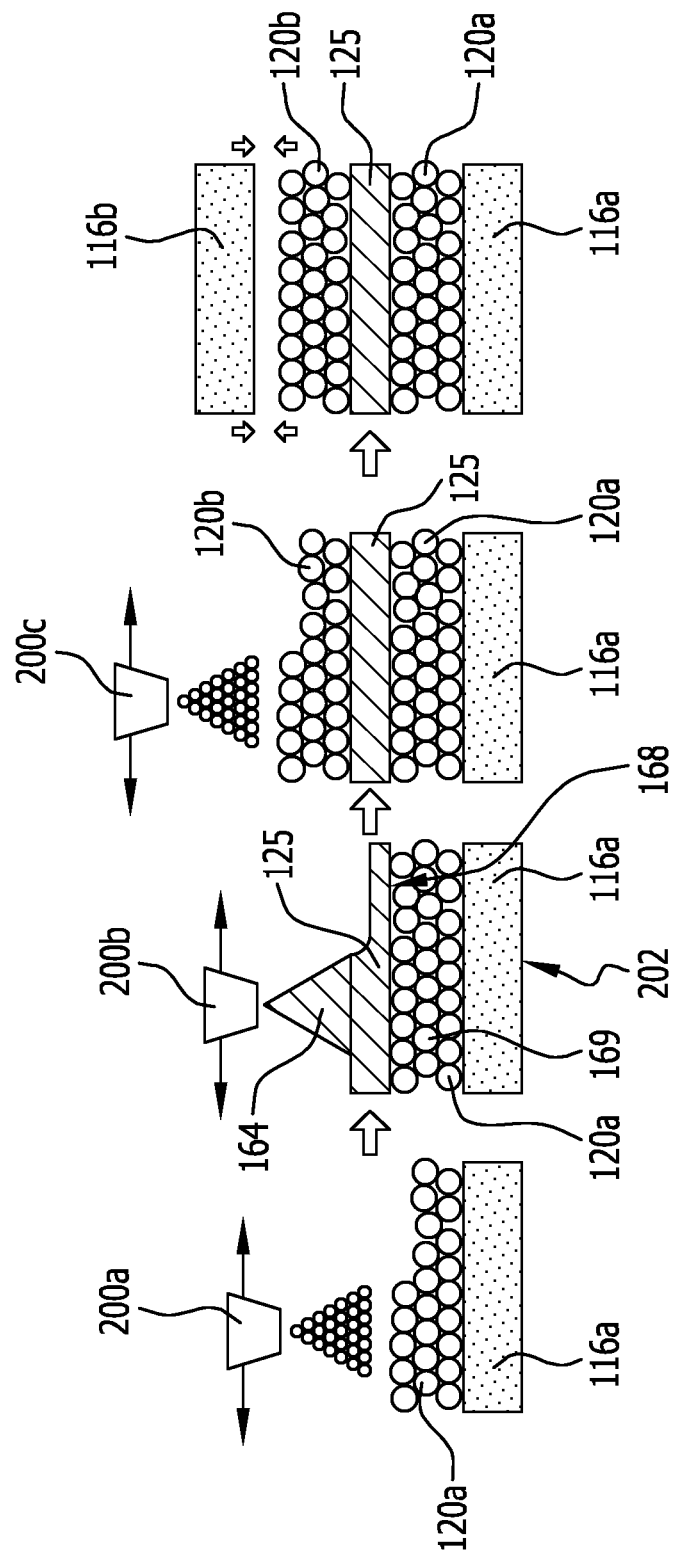
FIG. 4 shows a schematic depiction of a further variant of an assembly of a fuel cell.
Figure 5:
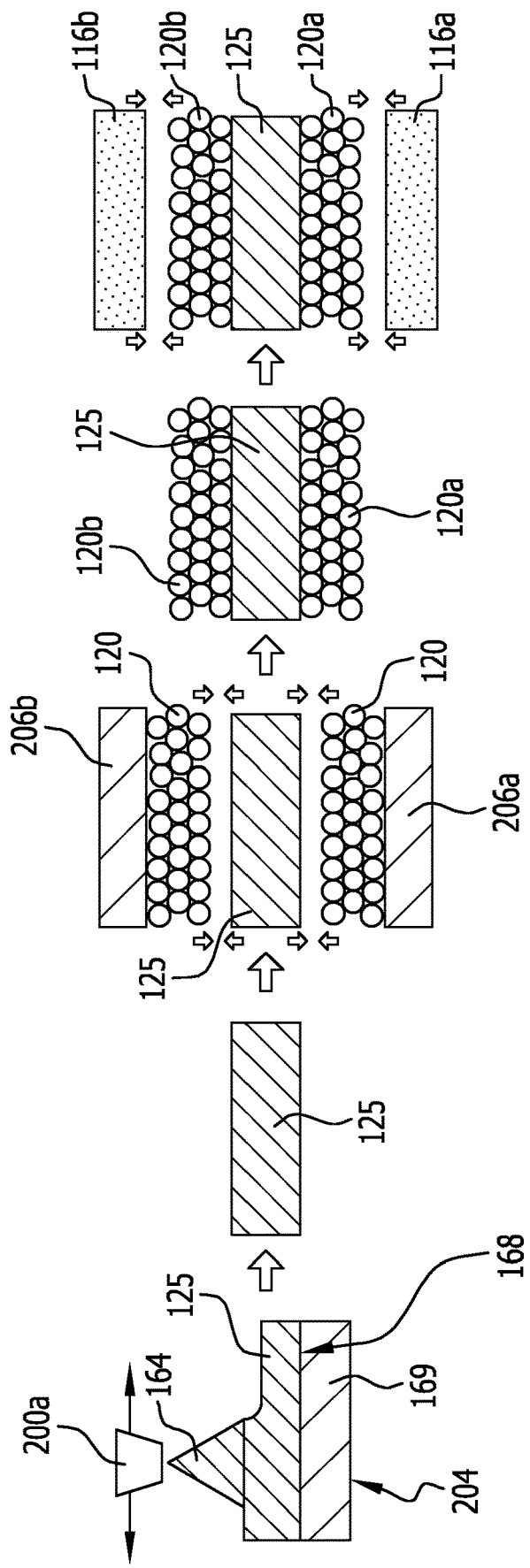
FIG. 5 shows a schematic depiction of a further variant of an assembly of a fuel cell.

Different possibilities for the application or an assembly are described in more detail in the context of variants for assembly that are depicted in FIG. 3 to FIG. 5.

Alternatively, the nanorod ionomer dispersion 164 may be applied to a surface region 168 in a redox flow cell or to a surface region 168 of an ion exchanger (anion exchanger or cation exchanger) and the resulting composite layer 125 may be used in the redox flow cell or in the ion exchanger as an electrochemically active membrane.

For the application of the nanorod ionomer dispersion 164 (fourth method step 166), the nanorod ionomer dispersion 164 is presently applied to the surface region 168 of the substrate in a print coating method.

Doctor blading is particular preferred as a print coating method. Alternatively, the nanorod ionomer dispersion 164 can also be applied by means of screen printing, slit printing, inkjet printing, or engraving.

Alternatively to print coating methods, drop casting or a spray coating method is suitable for applying the nanorod ionomer dispersion 164 to the surface region 168 of the substrate 169.

The nanorod ionomer dispersion 164 may be applied to the surface region 168 in one layer or in a plurality of layers.

In embodiments in which a plurality of layers of nanorod ionomer dispersions 164 are applied, a concentration gradient of nanorods 128 in the resulting composite layer 125 can thereby be formed.

For this purpose, in each case nanorod ionomer dispersions 164 with decreasing or increasing concentrations of nanorods 128 from layer to layer are used in the different application steps (different layers).

Alternatively, different layers of nanorod ionomer dispersions 164 with nanorods 128 made of different materials may be used. Due to the different materials of nanorods 128, it is possible to obtain composite layers 125 with different properties within the respective composite layer 125.

For example, a first layer of a nanorod ionomer dispersion 164 with a share of about 1% by weight platinum-coated titanium dioxide nanorods 128 is applied. Then, a second layer of a nanorod ionomer dispersion 164 with a share of about 10% by weight platinum-coated titanium dioxide nanorods 128 is applied.

The resulting composite layer 125 then has a layer with a higher nanorod share and a layer with a lower share of nanorods 128. The layer of the composite layer 125 with the higher share of nanorods is, in particular, mechanically and thermally more stable.

A plurality of layers are preferably applied by means of a spray coating method.

When applying the nanorod ionomer dispersion 164 in a plurality of layers, functional intermediate layers can also be integrated into the composite layer 125 in a targeted manner.

For example, a layer of a nanorod ionomer dispersion 164, comprising cerium oxide nanorods 128, is arranged to an anode side of the fuel cell 102. A chemical degradation that occurs on the anode side can thus be influenced.

In accordance with a further embodiment, a gradient for thermal stabilization with an increased share of titanium dioxide nanorods 128 is arranged on the anode side of the fuel cell 102. This serves to moisturize the fuel cell 102.

In accordance with a further embodiment, a layer with an increased share of PBI or DVDF nanorods 128 is arranged toward a cathode side of the fuel cell 102 in order to substantially prevent or reduce swelling there due to cathode-side water production.

Analogously, functional intermediate layers and/or concentration gradients can be formed in composite layers 125 that are used in electrolytic cells, in redox flow cells, or in ion exchangers.

A total thickness 165 of the composite layer 125 is typically in a range from about 1 μm to about 100 μm.

As already mentioned with regard to FIG. 1, a total thickness 165 of the composite layer 125 for a use in fuel cells 102 (as in FIG. 1), in particular in vehicles, is preferably about 5 μm to about 25 μm.

In the case of composite layers 125 that are used in electrolytic cells, total thicknesses 165 of the composite layers 125 are preferably each in a range from about 20 μm to about 80 μm.

In the case of composite layers 125 that are used in redox flow cells, total thicknesses 165 of the composite layers 125 are preferably in each case in a range from about 20 μm to about 50 μm.

The ionomer component 162 is contained in the composite layer 125 with a share of about 80% by weight to about 95% by weight based on the total weight of the composite layer 125.

According to a fifth method step 170, the composite layer 125, that is formed during and/or after the application of the nanorod ionomer dispersion 164 is crosslinked.

Figure 15:
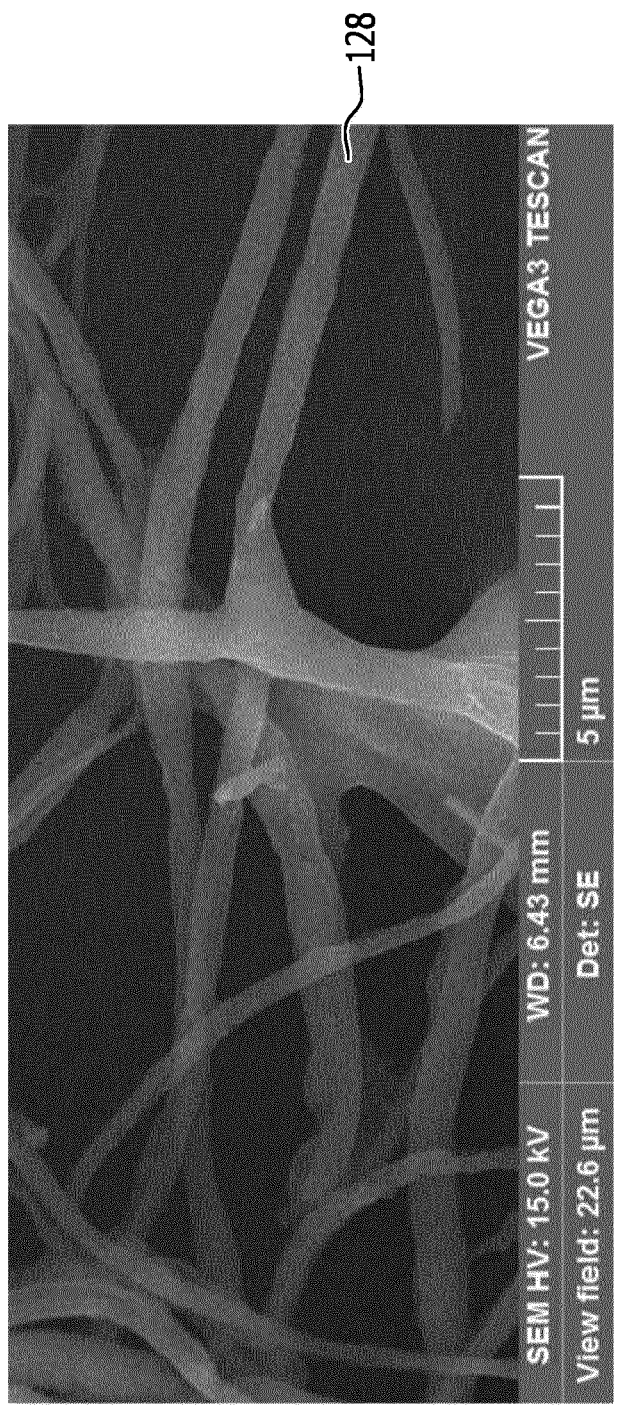
FIG. 15 shows a scanning electron microscopy image of crosslinked PBI nanorods.

A scanning electron microscopy image of crosslinked nanorods 128 of PBI is depicted in FIG. 15. This is described in more detail in the context of Embodiment 9.

Alternatively to PBI nanorods 128, nanorods 128 of a different material may also be crosslinked. Nanorods 128 made of a polymeric material are particularly preferable for crosslinking.

During crosslinking, a chemical reaction of molecules of a polymer of a nanorod 128 with molecules of a polymer of a further nanorod 128 takes place, wherein the nanorods 128 must have a spatial contact point for crosslinking.

In addition or alternatively, a chemical reaction of molecules of a polymer of the ionomer component 162 with molecules of a polymer of the ionomer component 162 and/or a chemical reaction with molecules of a polymer of the nanorods 128 takes place.

The chemical reaction is stated by a heat treatment and/or a treatment with electromagnetic radiation, in particular in the ultraviolet region.

A crosslinking, in particular a covalent bonding, of different nanorods 128 at contact points of said nanorods 128, after the composite layer 125 has been formed, serves to additionally increase the mechanical reinforcement of the composite layer 125.

In the case of forming a crosslinking by chemical and/or thermal methods, crosslinking agents that can react with a material of the corresponding nanorod 128 may be provided for reaction either
- before a manufacturing process of the nanofiber material 152, for example before an electrospinning method; or
- after forming the composite layer 125, for example by means of dipping the composite layer 125 in a crosslinking agent solution.

In accordance with a further alternative, the crosslinking agent may also be added during the application of the nanorod ionomer dispersion 164 to the surface region 168 of the substrate 169.

For example, di-, tri-, or polyamines, in particular primary diamines, are suitable as a crosslinking agent for a crosslinking of nanorods 128 that comprise PVDF.

For a crosslinking of nanorods 128 that comprise PBI or are formed substantially therefrom, e.g., dialdehydes, in particular glutaraldehyde, dichloro compounds, or dibromo compounds, in particular (α, α')-dibromo-para-xylene, or diiodine compounds, in particular diiodooctane, for example 1,8-diiodooctane, are particularly suitable as a crosslinking agent. For example, PBI in anionic form with alkali metal ions as a counter ion is introduced into the composite layer 125 and then is electrophilically and/or covalently crosslinked by way of 1,8-diiodooctane.

By a reaction with 1,8-diaminooctane, a covalent cross-linking between different nanorods 128 can be formed. For example, 1,8-diaminooctane is used for crosslinking PVDF-based nanorods 128.

In accordance with the invention, there are a plurality of variants according to which an electrochemical unit 100 can be assembled.

One variant for assembling an electrochemical unit 100 in the form of a fuel cell 102 is depicted in FIG. 3.

First, an electrode material, presently a first catalyst layer 120a, is applied to a first gas diffusion layer 116a in an application method, for example a spray coating. The first gas diffusion layer 116a forms a substrate 202 for the first catalyst layer 120a.

A first microporous layer 118a (cf. FIG. 1), which may be arranged between the first gas diffusion layer 116a and the first catalyst layer 120a, is not depicted.

For the application of the electrode material, preferably a first application device 200a is moved over a surface of the first gas diffusion layer 116a. Alternatively, the first application device 200a may be spatially fixed, and the first gas diffusion layer 116a is moved relative to the first application device 200a.

After forming the first catalyst layer 120a on the first gas diffusion layer 116a, by means of a second application device 200b, a nanorod ionomer dispersion 164 is applied, presently by means of a spray coating method, to a surface region 168 of the first catalyst layer 120a, thereby forming a composite layer 125. Presently, a continuous spray coating method is used.

The arrangement of the first gas diffusion layer 116a and the first catalyst layer 120a, which functions as an electrode, hereby forms a substrate 169 for the composite layer. The nanorod ionomer dispersion 164 is presently applied to a surface region 168 formed by the first catalyst layer 120a.

Alternatively to the spray coating method, the nanorod ionomer dispersion 164 can also be applied after a further method described in conjunction with FIG. 2.

The composite layer 125 preferably has one or more of the features described in conjunction with FIG. 2.

A first arrangement of the first gas diffusion layer 116a, the first catalyst layer 120a (electrode) and the composite layer 125 has been created. A second arrangement, identical with respect to production, of a second gas diffusion layer 116b, a second catalyst layer 120b (electrode) and a further composite layer 125 is produced.

Even if the arrangements are identical with respect to production, the layer thicknesses may still vary. A layer thickness of the second catalyst layer 120b (cathode) is preferably four times as thick as a layer thickness of the first catalyst layer 120a (anode).

The first arrangement and the second arrangement are connected to one another in such a way that the two composite layers 125 directly adjoin one another and are directly connected to one another.

According to a further variant, depicted in FIG. 4, for assembling an electrochemical unit 100, first, as in the variant depicted in FIG. 3, a first catalyst layer 120a is applied to a first gas diffusion layer 116a by means of a first application device 200a.

Then, a composite layer 125 is formed by applying, presently spray coating, a nanorod ionomer dispersion 164 on the first catalyst layer 120a.

As according to the variant of assembly described in the context of FIG. 3, the first catalyst layer 120a forms a surface region 168 of a substrate 169. The substrate is formed by the first gas diffusion layer 116a and the first catalyst layer 120a.

For this purpose, a second application device 200b is moved relative to the surface region 168 of the substrate 169 formed by the first gas diffusion layer 116a and the first catalyst layer 120a.

After forming the composite layer 125, a second catalyst layer 120b is applied to the composite layer 125 by means of a third application device 200c, which is moved relative to a surface of the composite layer 125. Then, a second gas diffusion layer 116b is applied to the second catalyst layer 120b and/or fixed thereto.

The previously described variant of assembly that is schematically depicted in FIG. 4 is a variant for one-sided assembly of an electrochemical unit 100 in which the assembly takes place from one side of the composite layer 125.

A further variant for assembling an electrochemical unit 100, presently a fuel cell 102, is depicted in FIG. 5. According to this variant, the composite layer 125 is handled separately. This variant is a variant for two-sided assembly of an electrochemical unit 100 in which an assembly takes place from both sides of the composite layer 125.

On a carrier film 204, a nanorod ionomer dispersion 164 is sprayed on a surface region 168 of the carrier film 204 by means of a first application device 200a or is applied by means of a further application method described in conjunction with FIG. 2. Here, the carrier film 204 is a substrate 169 for the composite layer 125.

The carrier film 204 is also referred to as a so-called decal film. Different materials are suitable as carrier films 204. For example, films made of PTFE, PP, PE, glass, in particular plexiglass, may be used. A carrier film 204 made of fiber-reinforced PTFE from HiTechflon® or from BOHME-KUNSTSTOFFTECHNIK GMBH & CO. KG is particularly preferable.

The resulting composite layer 125 is then removed from the carrier film 204 by detachment.

Then, the composite layer 125 is positioned between a first arrangement of a first carrier film 206a and a first catalyst layer 120a and a second arrangement of a second carrier film 206b and a second catalyst layer 120b. After positioning, the composite layer 125 directly adjoins the first and second catalyst layers 120a, 120b.

The first carrier film 206a for the first catalyst layer 120a and the second carrier film 206b for the second catalyst layer 120b are removed from the respective catalyst layers 120a, 120b after a connection of the first catalyst layer 120a and the second catalyst layer 120b to the composite layer 125.

Then, a first gas diffusion layer 116a and a second gas diffusion layer 116b are each applied to surfaces of the first catalyst layer 120a and the second layer 120b, respectively, said surfaces facing away from the composite layer 125.

Each of the aforementioned variants can be used to produce the fuel cell 102 depicted in FIG. 1. Provision may thereby be made that a first microporous layer 118a and a second microporous layer 118b, respectively, are arranged between the first gas diffusion layer 116a and the first catalyst layer 120a, as well as between the second gas diffusion layer 116b and the second catalyst layer 120b.

Alternatively to an application of the composite layer 125 on carrier films 206a, 206b provided with catalyst layers 120a, 120b, the composite layer 125 may be also be arranged between gas diffusion layers 116a, 116b provided with catalyst layers 120a, 120b.

The first and second bipolar plates 112a, 112b may be attached to the gas diffusion layers 116a, 116b before performing the described variants for assembling an electrochemical unit 100. Alternatively, the first and second bipolar plates 112a, 112b may also be fixed to the first and second gas diffusion layers 120a, 120b after one of the previously described variants for assembling an electrochemical unit 100.

In the following, a respective production of a nanofiber material 152 and the comminution thereof to nanorods 128 is described on the basis of eight exemplary embodiments. In Embodiment 1, the production of the composite layer 125 is also described. A crosslinking of nanorods 128 is described as an example on the basis of Embodiment 9.

Within the meaning of the invention, room temperature is to be understood as a temperature of about 25° C.

EXEMPLARY EMBODIMENTS

Exemplary Embodiment 1—PBI Nanofibers

A precursor solution with about 16% by weight to about 18% by weight PBI and about 8% by weight to about 9% by weight lithium chloride in N,N-dimethylacetamide (in each case based on the total weight of the precursor solution) is produced, which is stirred for about 24 hours at about 140° C.

After cooling the precursor solution to room temperature, an electrospinning method is performed in a controlled environment with a relative humidity of about 30% and a temperature of about 30° C. A distance between a nozzle and a counter electrode is about 15 cm and the nozzle has a diameter of about 0.6 mm.

An acceleration voltage of about 12 kV is applied between the nozzle and the counter electrode. The precursor solution is injected at an injection rate of about 8 µl/min through the nozzle into an electric field that is created by the applied voltage.

A nanofiber material 152 is deposited on an aluminum foil. The aluminum foil is hereby positioned at or in front of the counter electrode. The nanofiber material 152, which is presently configured as a fiber mat (fibrous body 154), is detached from the aluminum foil after completion of the electrospinning method.

The fiber mat is treated with water for about 12 hours at room temperature in order to dissolve lithium chloride present in the fiber mat. Then, the fiber mat is dried for about 24 hours in a vacuum (less than 0.1 mbar, room temperature).

Figure 6:
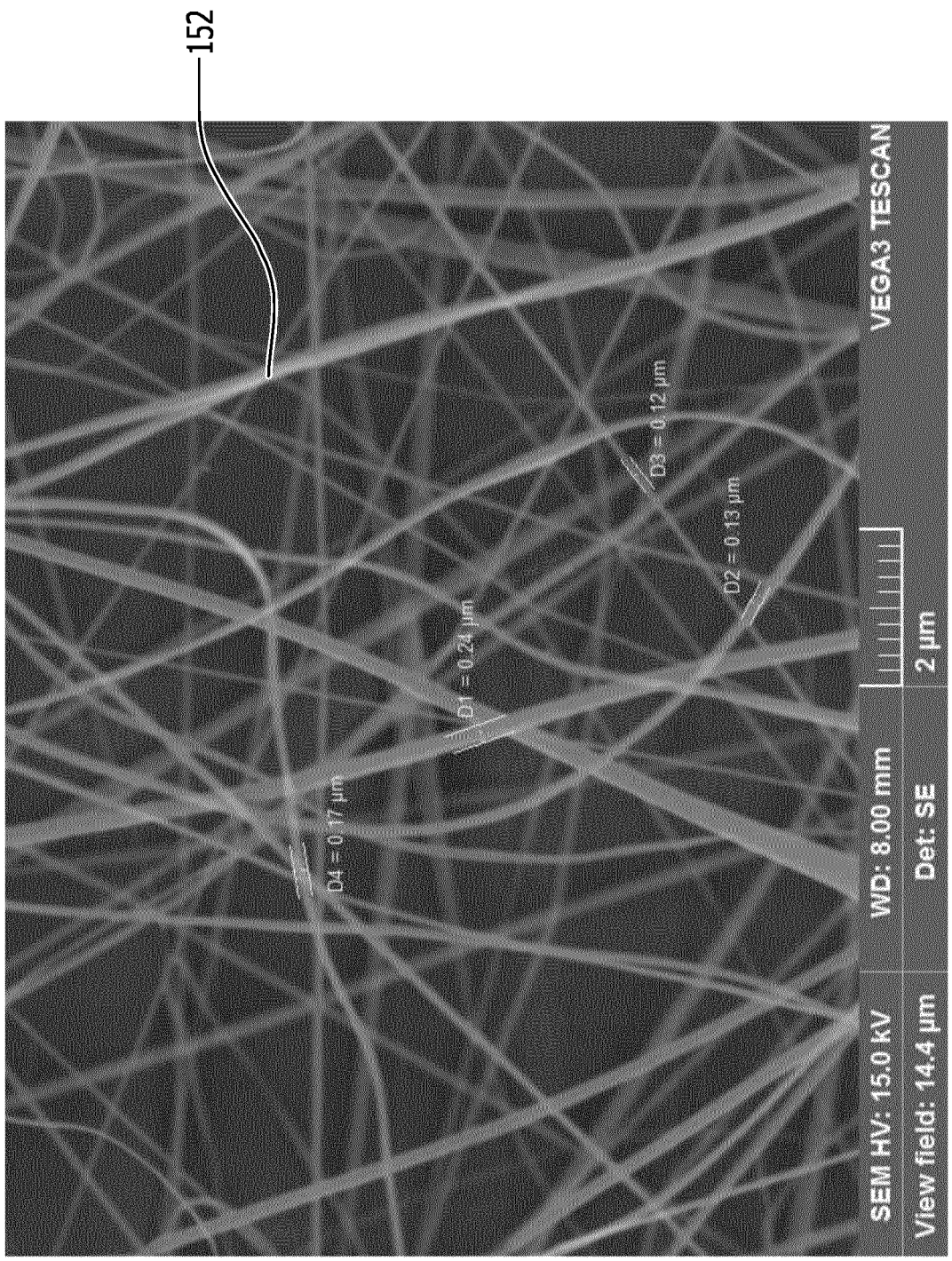
FIG. 6 shows a scanning electron microscopy image of a nanofiber material made of PBI nanofibers.

A scanning electron microscopy image, depicted in FIG. 6, of nanofibers of the nanofiber material 152 shows substantially monodisperse nanofibers with diameters in a range from about 0.12 µm to about 0.24 µm. The scanning electron microscopy image was taken with a secondary electron detector with an acceleration voltage of about 15 kV.

The PBI nanofiber material 152 is then added to a mixture of 2-propanol and deionized water (in a volume ratio of 1:1), such that a content of the PBI nanofiber material of about 1% by weight is obtained. Then, the mixture containing the PBI nanofiber material 152 is homogenized for about 2 hours in an ice bath by means of an ultrasonic lance with a power of 250 W, thereby creating PBI nanorods 128 from the PBI nanofibers of the PBI nanofiber material.

The nanorods 128 of PBI are then separated from the rest of the mixture.

Figure 7:
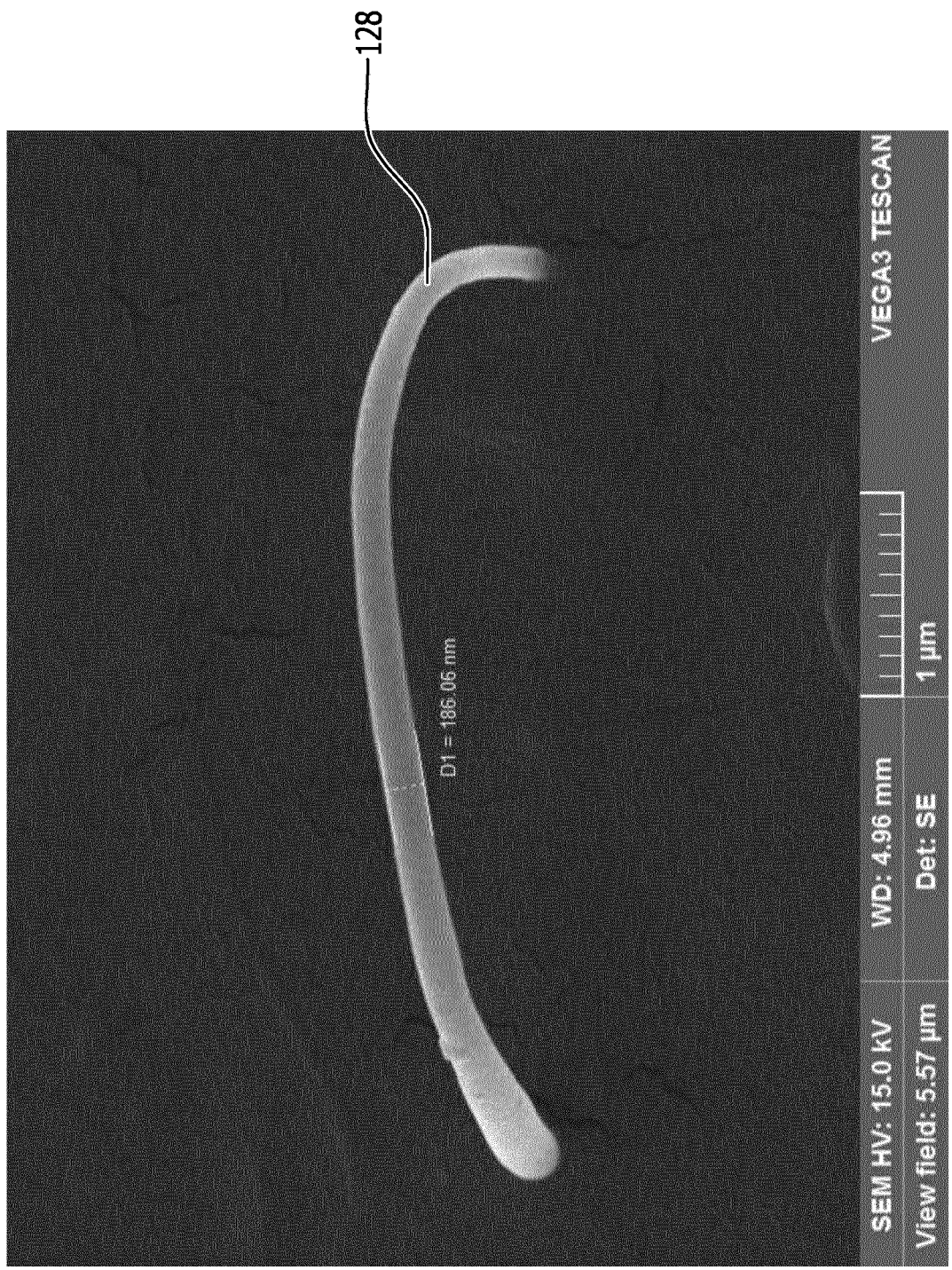
FIG. 7 shows a scanning electron microscopy image of a single PBI nanorod.

Depicted in FIG. 7 is a scanning electron microscopy image of a single nanorod 128, which consists substantially of PBI. The image was taken with an acceleration voltage of about 15 kV and using the secondary electron detector.

The nanorods 128 have a significantly reduced length of just over 5 µm in comparison to the nanofibers of the nanofiber material 152 from FIG. 6. The diameter of the nanorod 128 is about 186 nm. Compared to the image of the nanofiber material 152 depicted in FIG. 6, a comminution in the longitudinal direction has taken place.

The nanorods 128 of PBI are then added to a liquid medium 160 of an ionomer component 162 and a dispersant 163 in the form of 2-propanol, and a ratio of a weight of the ionomer component 162 and a weight of the nanorods 128 of 9:1 is set, thereby creating a nanorod ionomer dispersion 164.

Figure 8:
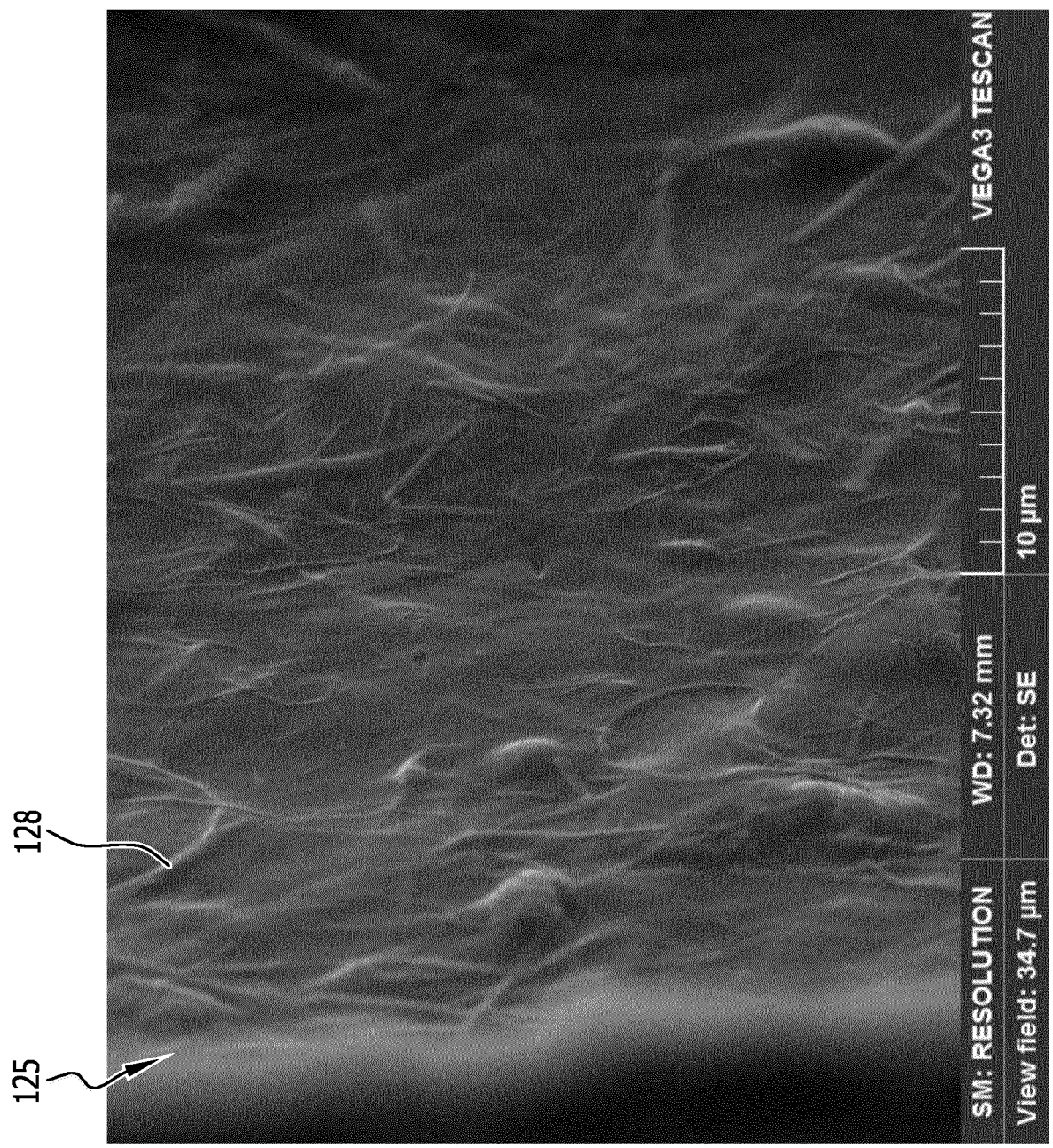
FIG. 8 shows a scanning electron microscopy image of a composite layer made of about 90% by weight ionomer component and about 10% by weight nanorods made of PBI.

The nanorod ionomer dispersion 164 is then applied to a surface region 168 of a substrate 169 by means of ultrasound-assisted spray coating. The spray coating method is performed at a deposition rate of about 0.2 ml/min and an ultrasonic power of the spray nozzle of about 3 W. A scanning electron microscopy image depicted in FIG. 8 shows a composite layer 125 that was produced as previously described. The image is taken at a 45° angle to a surface of the composite layer 125.

The scanning electron microscopically characterized composite layer 125 has a comparatively uniform total thickness. The total thickness of the composite layer 125 is presently about 10 µm. It can be seen in the scanning electron microscopy image that the nanorods 128 are embedded in an ionomer material resulting from the ionomer component.

Alternatively to the spray coating, the previously described nanorod ionomer dispersion 164 is applied to the surface region 168 by means of doctor blading. For this purpose, the liquid medium 160 preferably has a share of 20% by weight ionomer component 162 in a mixture of 2-propanol and deionized water in a ratio of 1:1 based on a total weight of the liquid medium 160. A weight ratio of ionomer component 162 and PBI nanofiber material 152 is 9:1.

A wet film thickness when doctor blading is set to about 50 µm. The total thickness 165 of the resulting composite layer 125 is about 11 µm. A share of the nanorods 128 made of PBI in the composite layer 125 is about 10% by weight.

Exemplary Embodiment 2—PBI/PVDF Nanofibers

A precursor solution with about 11% by weight PBI, about 11.5% by weight PVDF, and about 5.5% by weight lithium chloride in N,N-dimethylacetamide (in each case based on the total weight of the precursor solution) is produced and is stirred for about 24 hours at about 160° C. After cooling to room temperature, an electrospinning method is performed in a controlled environment with a relative humidity of about 30% and a temperature of about 30° C.

A distance between a nozzle and a counter electrode is about 15 cm and the nozzle has a diameter of about 0.6 mm. An applied acceleration voltage between the nozzle and the counter electrode is about 18 kV.

The precursor solution is injected at an injection rate of about 10 µl/min through the nozzle into an electric field that is created by the applied acceleration voltage.

The created nanofiber material 152 is deposited on an aluminum foil which, for this purpose, is positioned at or on the counter electrode. Alternatively, a different substrate may be used for deposition.

The nanofiber material 152 is detached from the aluminum foil, for example by means of forceps.

Presently a fibrous body 154 in the form of a fiber mat is created during the deposition, which fibrous body is cleaned by treatment for about 12 hours at room temperature in water and then is dried for about 24 hours in a vacuum at less than 0.1 mbar and room temperature.

Figure 9:
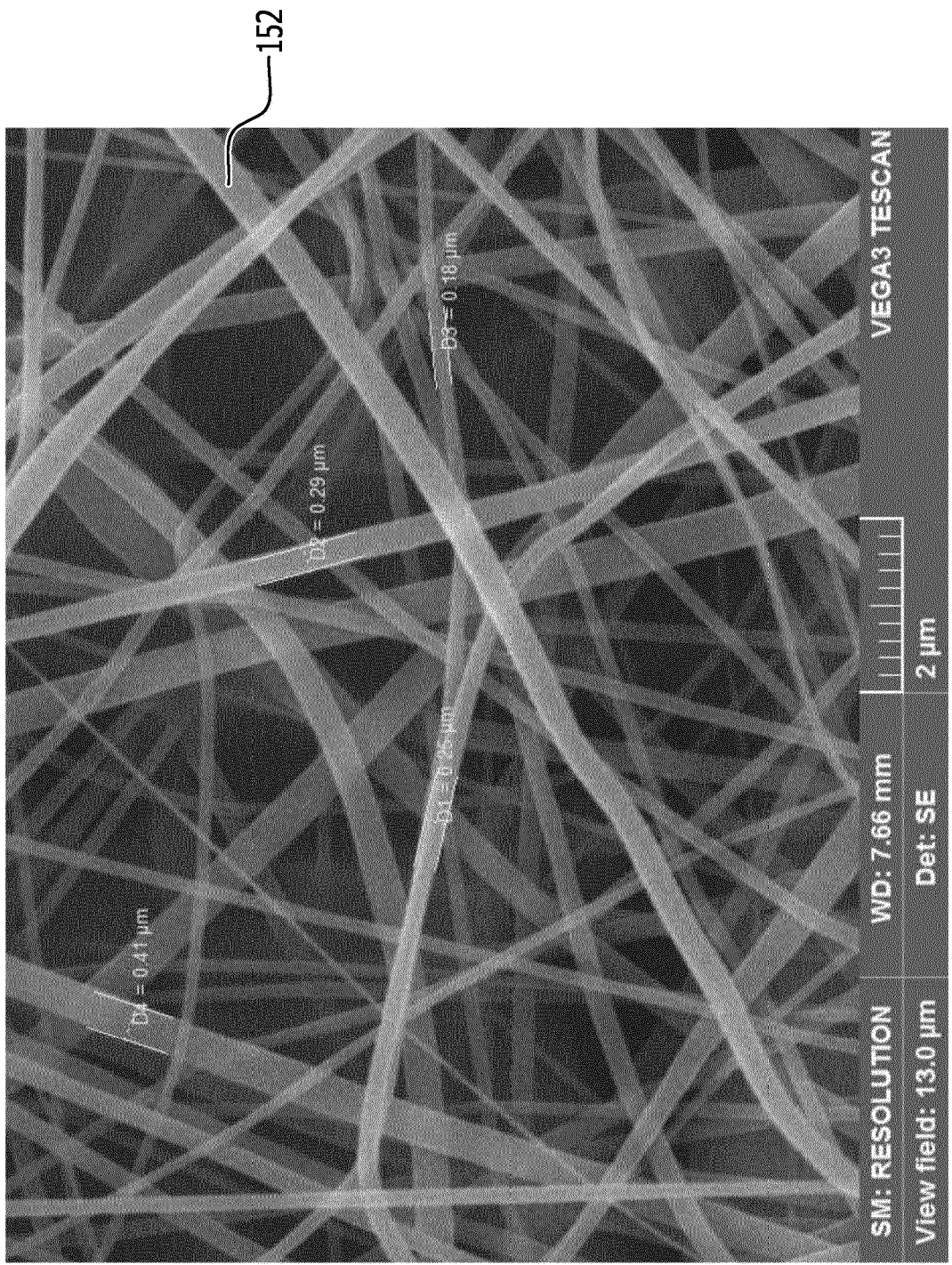
FIG. 9 shows a scanning electron microscopy image of a nanofiber material made of nanofibers of a PBI/PVDF blend.

In a scanning electron microscopy image, depicted in FIG. 9, of nanofibers of the nanofiber material 152 shows that substantially monodisperse nanofibers with a diameter in a range from about 0.18 µm to about 0.41 µm have been created.

Alternatively to the previously described nanofibers, nanofibers of a PBI-PVDF blend may also be produced. For this purpose, the precursor solution contains about 1.8% by weight PVDF, about 16.2% by weight PBI, and about 8.1% by weight lithium chloride in N,N-dimethylacetamide.

This precursor solution is then processed to a nanofiber material 152 in the electrospinning method with the previously described parameters.

A comminution of the nanofiber material 152 of PBI/PVDF can be performed as described in conjunction with the first embodiment.

Exemplary Embodiment 3—Cerium Oxide-Decorated PBI Nanofibers

A precursor solution with about 16% by weight PBI, about 8% by weight lithium chloride, and about 4% by weight cerium oxide ($CeO_2$) nanoparticles in N,N-dimethylacetamide (in each case based on the total weight of the precursor solution) is produced and is stirred for about 24 hours at about 140° C. The cerium oxide nanoparticles have an average diameter of about 25 nm.

After cooling the precursor solution to room temperature, an electrospinning method is performed in a controlled environment with a relative humidity of about 30% at a temperature of about 30° C.

A distance between a nozzle and a counter electrode is about 15 cm and a diameter of the nozzle is about 0.6 mm. An acceleration voltage of about 12 kV is applied between the nozzle and the counter electrode and the precursor solution is injected at an injection rate of about 8 µl/min through the nozzle into an electric field that is created by the applied acceleration voltage. An emerging nanofiber material 152 is deposited on an aluminum foil, a fibrous body 154 in the form of a nanofiber mat being formed. The formed fibrous body 154 in the form of a nanofiber mat is detached from the aluminum foil, cleaned for about 12 hours by treatment in water (at room temperature), and then dried for 24 hours in a vacuum (less than 0.1 mbar, room temperature).

Figure 10:
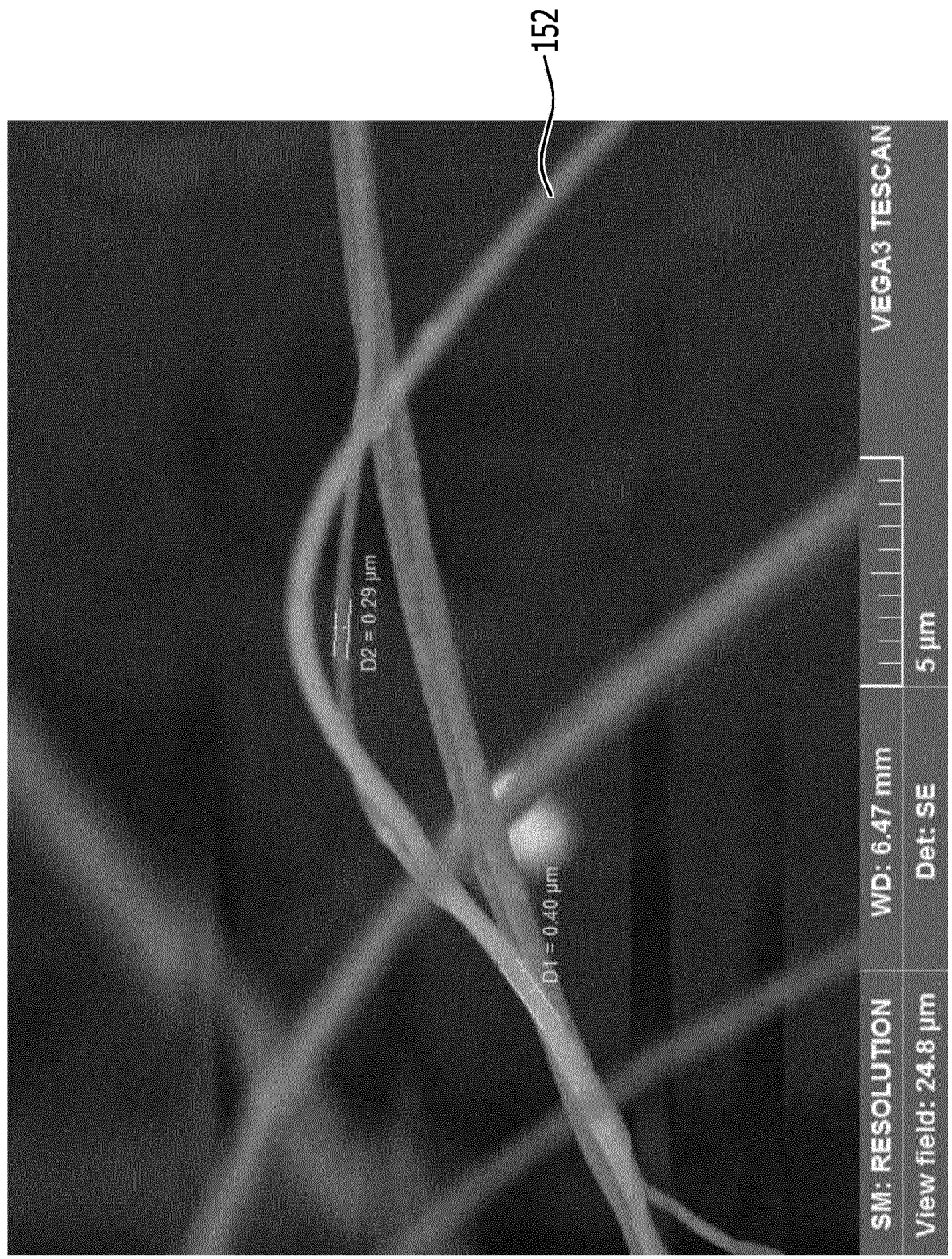
FIG. 10 shows a scanning electron microscopy image of a nanofiber material made of nanofibers of cerium oxide-decorated PBI nanofibers.

A scanning electron microscopy image depicted in FIG. 10 shows a nanofiber material 152 with nanofibers of PBI, which are decorated with cerium oxide nanoparticles. In the image, a spherical cerium oxide nanoparticle that is fixed to a nanofiber can be seen. It can be seen that the cerium oxide nanoparticle is still present in particulate form and that two exemplarily measured nanofibers have a diameter in a range from about 0.29 µm to about 40 µm.

As a result of the cerium oxide nanoparticle, a resulting composite layer 125 has an increased chemical stability due to increased radical-scavenging properties of cerium (IV) compounds.

A comminution of the nanofiber material 152 may be performed according to the method described in conjunction with Embodiment 1.

Exemplary Embodiment 4—Cerium Oxide Nanofibers

A precursor solution with about 17.6% by weight PVP, about 14% by weight cerium (III) nitrate hexahydrate in deionized water (in each case based on the total weight of the precursor solution) is produced and is stirred for about 24 hours at room temperature.

Then, an electrospinning method is performed in a controlled environment with a relative humidity of about 30% and a temperature of about 30° C.

A distance between a nozzle and a counter electrode is about 15 cm and the nozzle has a diameter of about 0.4 mm. An acceleration voltage of about 25 kV is applied between the nozzle and the counter electrode.

The precursor solution is injected at an injection rate of about 25 µl/min through the nozzle into an electric field that is created by the applied acceleration voltage.

A resulting nanofiber material 152 is collected on a PTFE film, wherein presently a fibrous body 154 in the form of a fiber mat is created.

The nanofiber material 152 is presently thermally post-treated in air for about 6 hours in an oven at about 500° C. Here, the PVP functioning as a carrier polymer is oxidized to volatile or evaporable products (carbon dioxide, nitrogen oxides, and water). Cerium (II) nitrate is oxidized during the thermal post-treatment to cerium (IV) oxide.

It may be advantageous if the nanofiber material 152 has few nanofiber layers (in particular fewer than ten layers) in order to avoid a melting of individual nanofibers during the thermal post-treatment.

Figure 11:
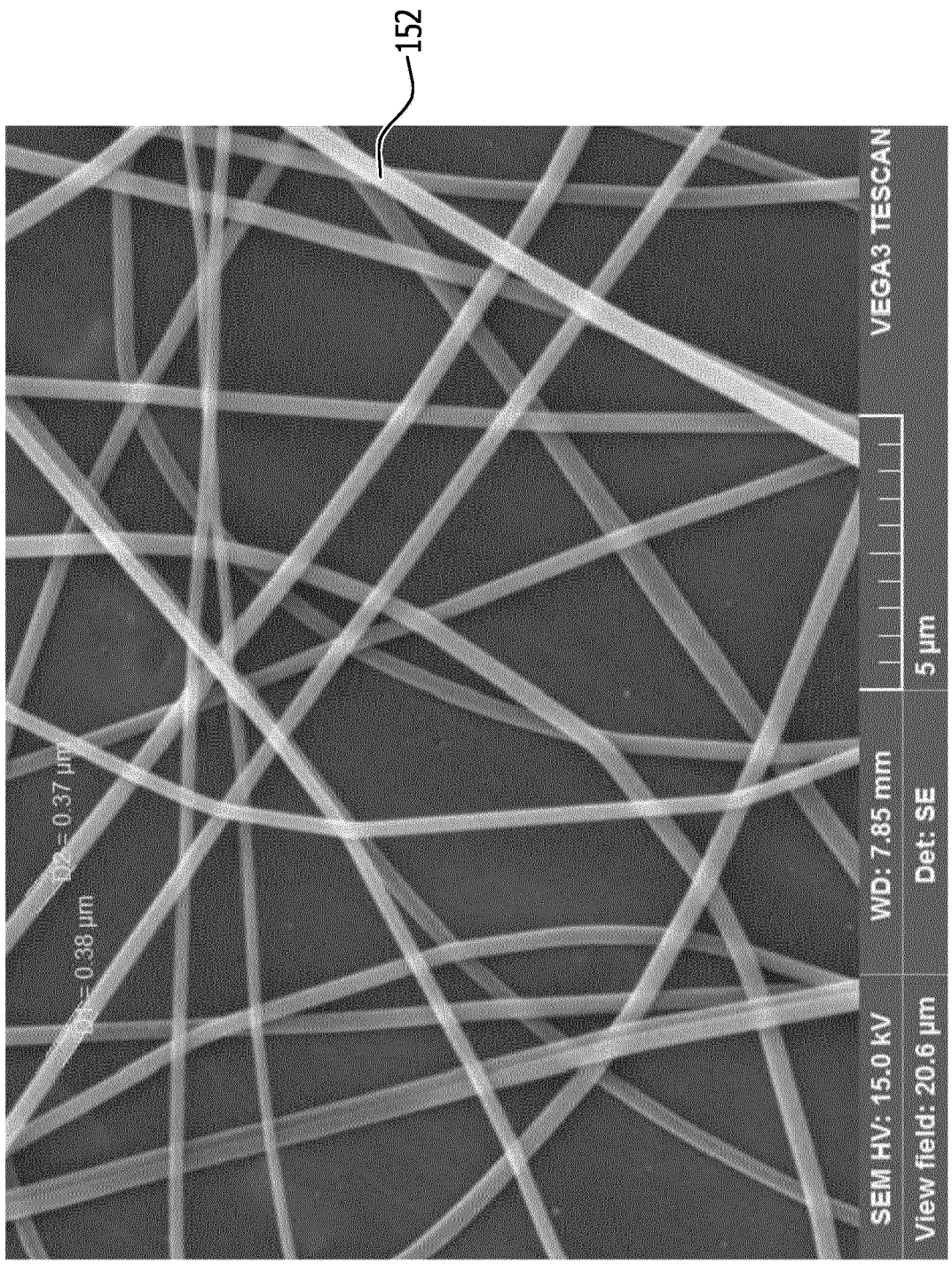
FIG. 11 shows a scanning electron microscopy image of a nanofiber material made of nanofibers of PVP cerium nitrate nanofibers.

A scanning electron microscopy image, shown in FIG. 11, of nanofibers of the nanofiber material 152 show that the nanofiber material 152 is composed substantially of at least approximately monodisperse nanofibers. Two exemplarily measured nanofibers have a diameter of about 0.37 µm and about 0.38 µm, respectively. The scanning electron microscopy image is taken before the previously described thermal post-treatment.

The nanofiber material 152 is then dispersed in 2-propanol and is comminuted by means of sonication (the power of the ultrasonic lance being 250 W). The resulting nanorods 128 are distributed on a Petri dish and solvent that is present evaporates.

Alternatively to a thermal post-treatment before comminution, the nanofiber material 152 may first be comminuted and then the thermal post-treatment performed.

For this purpose, the nanorods 128 are thermally post-treated in air for 6 hours in the oven at about 500° C., wherein volatile or vaporizable oxidation products of the carrier polymer are removed and cerium nitrate is oxidized to cerium oxide.

In embodiments in which the nanofiber material 152 has been thermally post-treated, the cerium oxide nanofibers are comminuted, as described in conjunction with the previous embodiments.

As a result of nanorods 128 of cerium oxide, the chemical stability of the resulting composite layer 128 can be increased due to radical-scavenging properties of the cerium (IV).

Exemplary Embodiment 5—Titanium Dioxide Nanofibers

A precursor solution with about 9% by weight PVP and about 9% by weight titanium (IV) tetraisopropoxide (in each case based on the total weight of the precursor solution) in a mixture of methanol and glacial acetic acid (volume ratio of methanol to glacial acetic acid of 4:1) is produced and is treated in an ultrasonic bath at room temperature for about 30 min and then is stirred for about 2 hours at room temperature.

Then, an electrospinning method is performed in a controlled environment with a relative humidity of about 30% and a temperature of about 30° C.

A distance between a nozzle and a counter electrode is about 15 cm. The nozzle has a diameter of about 0.4 mm. An acceleration voltage of 18 kV is applied between the nozzle and the counter electrode.

The precursor solution is injected at an injection rate of about 500 µl/h through the nozzle into an electric field that is created by the applied acceleration voltage.

Presently, a fibrous body 154 in the form of a fiber mat that consists substantially of nanofibers deposited on an aluminum foil has been created.

Figure 12:
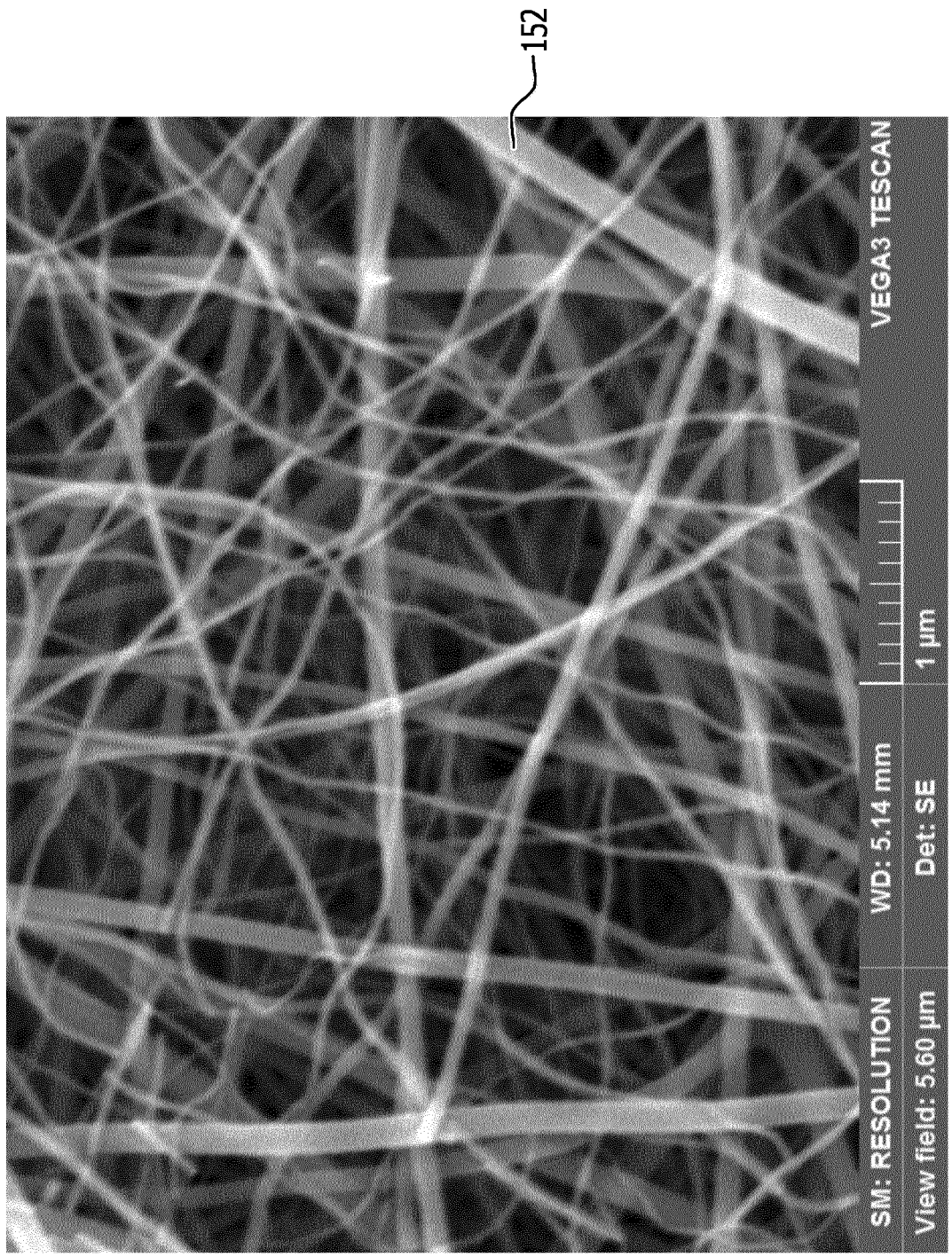
FIG. 12 shows a scanning electron microscopy image of a nanofiber material made of nanofibers of PVP/titanium tetraisopropoxide.

A scanning electron microscopy image, shown in FIG. 12, of nanofibers of the nanofiber material 152 shows that nanofibers with different diameters are present, but which can still be referred to as substantially monodisperse. There are nanofibers with comparatively larger diameters and nanofibers with comparatively smaller diameters. The image shows the nanofibers with carrier polymer before a thermal post-treatment.

As described in conjunction with Embodiment 4, the nanofiber material 152 may be thermally post-treated either before it is comminuted to nanorods 128, or a comminution is performed first before the nanorods 128 are thermally post-treated.

The thermal post-treatment is performed according to the parameters described in conjunction with Embodiment 4.

Exemplary Embodiment 6—Cerium Oxide-Doped Titanium Dioxide Nanofibers

A precursor solution with about 9% by weight PVP, about 9% by weight titanium (IV) tetraisopropoxide, and about 0.9% by weight cerium (III) nitrate (in each case based on the total weight of the precursor solution) in a mixture of methanol and glacial acetic acid (volume ratio of methanol to glacial acetic acid of 4:1) is produced and is treated in the ultrasonic bath at room temperature for about 30 minutes before it is stirred for about 2 hours at room temperature.

Then, an electrospinning method is performed in a controlled environment with a relative humidity of about 30% and a temperature of about 30° C.

A distance between a nozzle and a counter electrode is about 15 cm. The nozzle has a diameter of about 0.4 mm. An acceleration voltage of about 18 kV is applied between the nozzle and the counter electrode.

The precursor solution is injected at an injection rate of about 500 µl/h through the nozzle into an electric field that is created by the applied acceleration voltage.

An arising fibrous body 154 in the form of a fiber mat is formed by the deposition of nanofibers on an aluminum foil. The fiber mat is detached from the aluminum foil for further processing.

Figure 13:
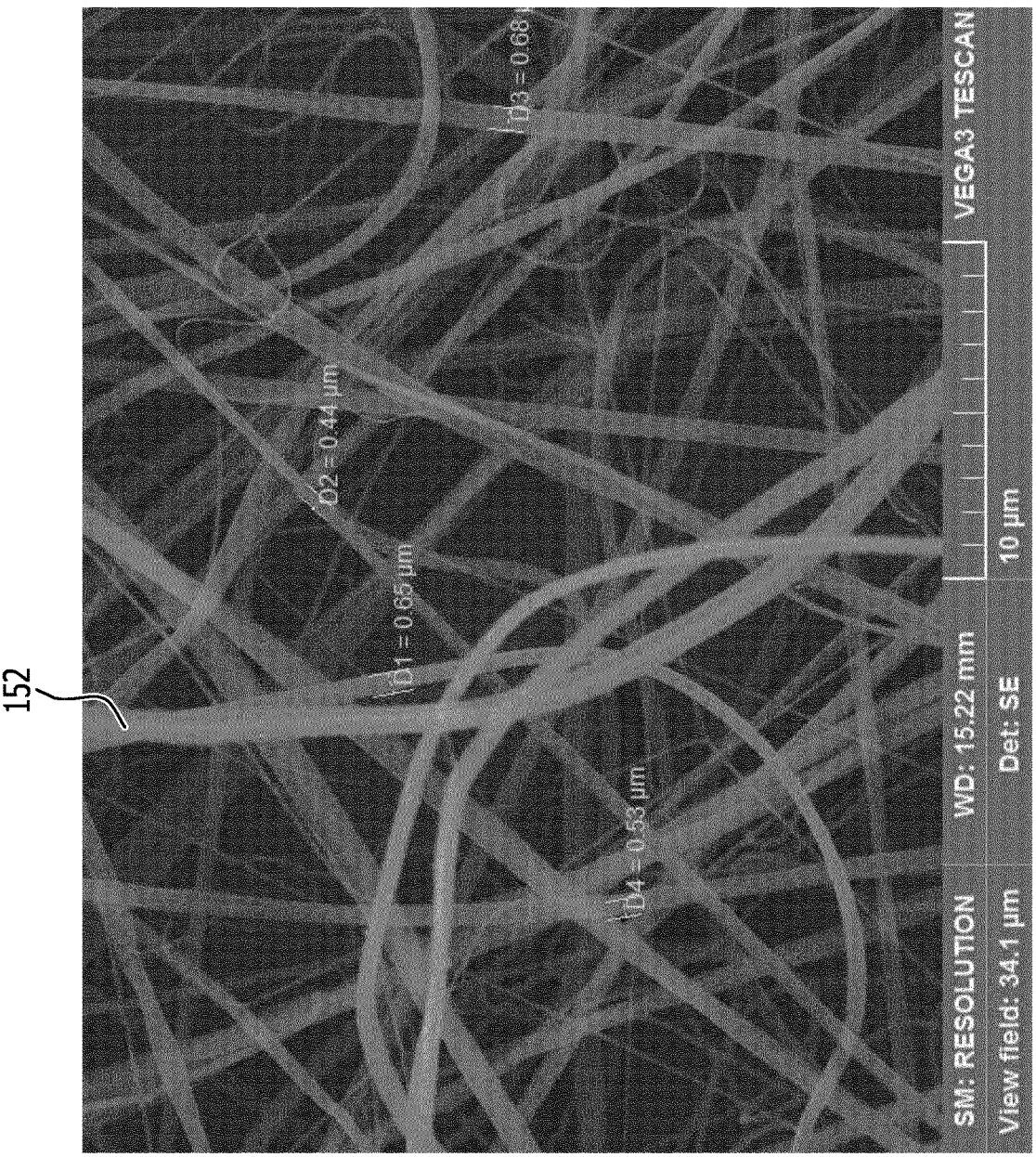
FIG. 13 shows a scanning electron microscopy image of a nanofiber material made of nanofibers of cerium oxide/titanium dioxide/PVP.

A scanning electron microscopy image, shown in FIG. 13, of nanofibers of the nanofiber material 152 shows that a nanofiber material 152 has been created that comprises comparatively thick nanofibers with diameters in a range from about 0.44 µm and about 0.68 µm. Further, comparatively thin nanofibers have been created, the diameter of which is smaller by a factor of four or more than the respective diameter of the thick nanofibers.

Reference is made to the previous embodiments regarding thermal post-treatment and comminution.

Exemplary Embodiment 7—Platinum-Coated Titanium Dioxide Nanofibers

A precursor solution with about 9% by weight PVP, about 9% by weight titanium (IV) tetraisopropoxide, and about 0.6% by weight platinum (II) acetylacetonate (in each case based on the total weight of the precursor solution) in a mixture of methanol and glacial acetic acid (volume ratio of methanol to glacial acetic acid of 4:1) is produced and is treated in an ultrasonic bath at room temperature for about 30 minutes and then is stirred for about 2 hours at room temperature.

Then, an electrospinning method is performed in a controlled environment with a relative humidity of about 30% and a temperature of about 30° C.

A distance between a nozzle and a counter electrode is about 15 cm. A diameter of the nozzle is about 0.4 mm. An acceleration voltage of about 18 kV is applied between the nozzle and the counter electrode.

The precursor solution is injected at an injection rate of about 500 µl/h through the nozzle into an electric field that is created by the applied acceleration voltage.

Presently, a nanofiber material 152 is created, which is deposited on an aluminum foil positioned at or on the counter electrode, wherein a fibrous body 154, presently a fiber mat, is formed. The fibrous body 154 is detached from the aluminum foil for further processing.

The nanofiber material 152 is thermally post-treated in air for about 6 hours in an oven at about 500° C. During the thermal post-treatment, the carrier polymer PVP is oxidized to volatile or evaporable products (carbon dioxide, nitrogen oxides, and water) and titanium (IV) tetraisopropoxide is oxidized to titanium dioxide.

Further, platinum (II) acetylacetonate is reduced by oxidation from acetylacetonate ligands to platinum with an oxidation state 0 (zero).

Due to thermal stresses during the thermal post-treatment, the nanofiber material 152 is presently already comminuted to nanorods 128 during the thermal post-treatment, thereby making an additional comminution step unnecessary.

Figure 14:
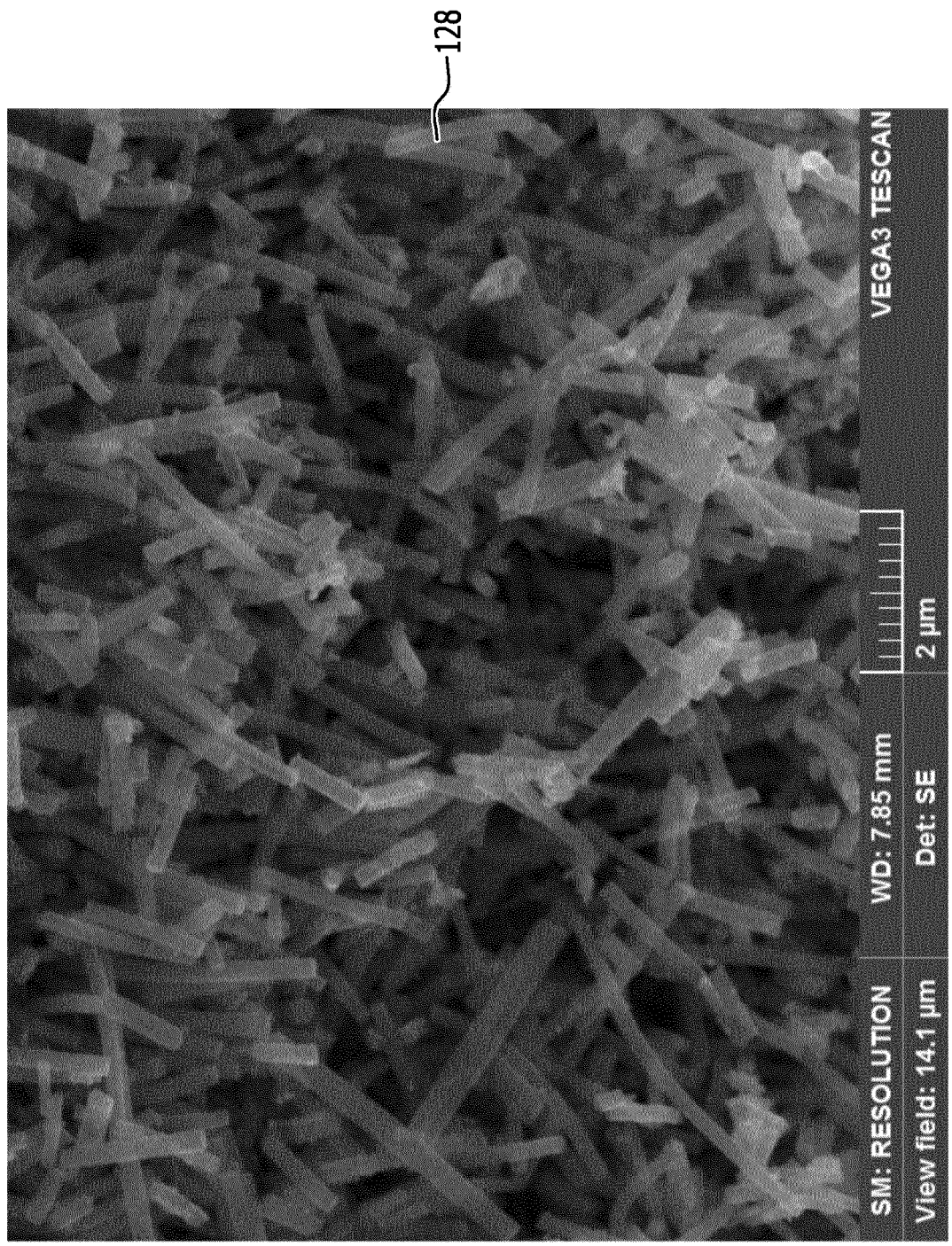
FIG. 14 shows a scanning electron microscopy image of platinum-coated titanium dioxide nanorods.

A scanning electron microscopy image, shown in FIG. 14, of the nanorods 128 shows that substantially monodisperse nanorods 128 have been created.

Exemplary Embodiment 8—Platinum-Coated Cerium Oxide-Doped Titanium Dioxide Nanofibers A precursor solution with about 9% by weight PVP, about 9% by weight titanium (IV) tetraisopropoxide, about 0.9% by weight cerium (III) nitrate, and about 0.6% by weight platinum (II) acetylacetonate (in each case based on the total weight of the precursor solution) in a mixture of methanol and glacial acetic acid (volume ratio of methanol to glacial acetic acid of 4:1) is treated in an ultrasonic bath at room temperature for about 30 minutes and then is stirred for about 2 hours at room temperature.

An electrospinning method is then performed. Reference is made to Embodiment 7 regarding parameters selected for the electrospinning method.

Reference is also made to Embodiment 7 regarding a thermal post-treatment that is performed after production of a nanofiber material 152.

As in Embodiment 7, in the case of the nanofiber material 152 of platinum-coated cerium oxide-doped titanium dioxide nanofibers, a comminution of the nanofiber material 152 to nanorods 128 takes place already during the thermal post-treatment.

Exemplary Embodiment 9—Crosslinked PBI Nanorods 128

PBI nanorods 128 are dispersed in water such that an about 0.5% by weight PBI nanorod dispersion (based the total weight of the dispersion) is created. The PBI nanorods 128 may be produced, e.g., according to the method described in Embodiment 1.

Sodium hydroxide is added to the PBI nanorod dispersion until an about 2 molar caustic soda is created. The sodium hydroxide-containing dispersion is stirred for about 12 hours at room temperature.

Then, the dispersion is deposited on a substrate by means of drop casting, wherein a film with a nanorod tangle is created. The substrate is selected such that the resulting film with the nanorod tangle is detachable from the substrate.

The film with the nanorod tangle is detached from the substrate and dipped into a solution of about 10% by weight 1,8-diiodooctane in 2-propanol. The 1,8-diiodooctane solution with the film with the nanofiber tangle is heated to a temperature of about 50° C. and is held at the temperature of about 50° C. for about 24 hours. A crosslinking of the nanorods 128 in the film with the nanofiber tangle takes place and crosslinked nanorods 128 are created.

The crosslinked nanorods 128 are washed with water after completion of the crosslinking in order to remove remaining (unreacted) 1,8-diiodooctane and sodium hydroxide as well as sodium iodide that was created during the crosslinking of the nanorods 128.

The resulting crosslinked PBI nanorods 128 are no longer soluble in N,N-dimethylacetamide.

A scanning electron microscopy image of the resulting crosslinked PBI nanorods 128 can be seen in FIG. 15. It can be seen in the image that the nanorods 128 are crosslinked such that more complex nanostructures have been created.

Alternatively to a successive addition, sodium hydroxide and 1,8-diiodooctane may also be added in one step, an in situ crosslinking of the nanorods 128 thereby taking place. The resulting dispersion is heated for about 24 hours to about 50° C. Then, the solvent is evaporated and the crosslinked nanorods 128 are washed with water as described.

The crosslinked nanorods 128 are no longer soluble in N,N-dimethylacetamide.

The invention claimed is:

1. A method for producing a composite layer, wherein the method comprises:
providing a nanofiber material, wherein the nanofiber material comprises a hydrophobic polymer selected from the group consisting of polytetrafluoroethylene (PTFE), polyvinylidene fluoride (PVDF), polybenzimidazole (PBI), polyolefins, polyether-etherketone (PEEK), and combinations thereof;
comminuting the nanofiber material while forming nanorods;
providing a liquid medium, which comprises an ionomer component and a dispersant;
dispersing the nanorods in the liquid medium while forming a nanorod ionomer dispersion; and
applying the nanorod ionomer dispersion to a surface region of a hydrogen fuel cell substrate while forming a composite layer as a part of said hydrogen fuel cell.

2. The method in accordance with claim 1, wherein the nanofiber material is provided by means of an electrospinning method, wherein an injection rate is in a range from about 0.1 µl/min to about 600 µl/min and/or an acceleration voltage is in a range from about 5 kV to about 30 kV.

3. The method in accordance with claim 2, wherein the electrospinning method is a needlefree electrospinning method.

4. The method in accordance with claim 1, wherein the nanofiber material is provided by means of a centrifugal spinning method, wherein a rotational speed is in a range from about 10 revolutions/min to about 6000 revolutions/min.

5. The method in accordance with claim 1, wherein the nanofiber material is provided by means of a solution blow spinning method, wherein an injection rate is in a range from about 10 µl/min to about 30 µl/min and/or a gas pressure of a carrier gas stream is in a range from about 100 kPa to about 500 kPa.

6. The method in accordance with claim 1, wherein the nanofiber material is provided as a fibrous body, wherein the fibrous body is a tangled mesh and/or as a non-woven fabric and/or as a fiber mat.

7. The method in accordance claim 1, wherein the nanofiber material comprises nanofibers, which have an average diameter of about 20 nm to about 3000 nm, or about 50 nm to about 700 nm.

8. The method in accordance with claim 1, wherein the nanofiber material is sintered before the comminution or the nanorods are sintered before the dispersion.

9. The method in accordance with claim 1, wherein the application of the nanorod ionomer dispersion comprises one or more of the following methods: drop-casting, print-coating methods, wherein the print-coating methods include doctor-blading, screen printing, slit printing, engraving, ink-jet printing, and spray coating methods.

10. The method in accordance with claim 1, wherein the nanorod ionomer dispersion is applied in a plurality of layers.

11. The method in accordance with claim 1, wherein the nanorods are contained in the nanorod ionomer dispersion with a share of about 1% by weight to about 50% by weight based on the total weight of the dispersion.

12. The method in accordance with claim 1, wherein the ionomer component is contained in the composite layer with a share of about 80% by weight to about 95% by weight based on the total weight of the composite layer.

13. The method in accordance with claim 1, wherein the composite layer has a total thickness in a range from about 1 µm to about 100 µm, or a range from about 5 µm to about 25 µm or in a range from about 20 µm to about 80 µm.

14. The method in accordance with claim 1, wherein the composite layer and/or the components thereof are cross-linked by treatment with electromagnetic radiation in the ultraviolet region and/or by of chemical methods including ionic or covalent crosslinking, and/or by thermal methods.

15. The method in accordance with claim 1, wherein the nanofiber material, optionally in the form of a fibrous body, is functionalized before the comminution by bringing the nanofiber material into contact with and/or heating the nanofiber material in caustic soda or caustic potash or sulfuric acid or phosphoric acid or in a metal salt solution including a platinum salt solution, a rhodium salt solution, a palladium salt solution, a ruthenium salt solution, or a mixed metal salt solution, wherein the mixed metal salt solution comprises a platinum cobalt salt solution or a platinum nickel salt solution.

16. The method in accordance with claim 1, wherein the nanofiber material is optionally provided in the form of a fibrous body, wherein the nanofiber material and/or the fibrous body comprises one or more additives, wherein in particular the one or more additives form a component of nanofibers of the nanofiber material, are applied to the nanofibers and/or are mixed with the nanofibers.

17. The method in accordance with claim 16, wherein the one or at least one of the plurality of additives comprise functional nanoparticles in granular form and/or fiber form, wherein the functional nanoparticles in granular form and/or fiber form comprise platinum, palladium, platinum cobalt, zirconium phosphate, zeolite materials, silicon oxide, and/or one or more metal oxides, wherein the one or more metal oxides is selected from cerium oxide and transition metal oxides including titanium oxide and/or manganese oxide.

18. The method in accordance with claim 1, wherein the nanofiber material upon comminution is acted upon with mechanical or thermal energy, and wherein the nanofiber material is comminuted by means of ultrasonic treatment and/or mechanical comminution, wherein the ultrasonic treatment and/or the mechanical comminution is conducted in a ball mill and/or in a mortar.

19. The method in accordance with claim 1, wherein the nanofiber material comprises or is substantially formed of coated nanofibers, and wherein the nanofibers are coated with noble metal selected from the group consisting of platinum, palladium, and combinations thereof.

20. The method in accordance with claim 1, wherein the nanorods have an aspect ratio of average length to average diameter of the nanorods of about 5 to about 25000, or about 10 to about 500, and wherein the nanorods have an average length of about 2 μm to about 500 μm, or about 5 μm to about 30 μm.

21. The method in accordance with claim 1, wherein the liquid medium comprises one or more of the following materials: fluorinated copolymers with sulfonic acid groups, in particular Nafion®, Aciplex®, Aquivion®, 3M® PFSA (Perfluorosulfonic Acid), Fumion®, and non-fluorinated polymers including hexamethyl-p-terphenyl-poly(benzimidazole), and polysulfones including polyarylethersulfones, ethylene-tetrafluoroethylene-copolymers and polyetheretherketone (PEEK).

22. The method in accordance with claim 1, wherein the surface region is a surface region of an electrode or of a carrier, wherein the carrier is a carrier film, wherein the surface region comprises or is substantially formed of carbon and/or metal.

23. The method in accordance with claim 1, wherein the composite layer is detached from the surface region and is handled as a separate element.

24. An electrochemical unit, comprising a composite layer, wherein the composite layer is produced in a method in accordance with claim 1.

25. The method according to claim 1, wherein the hydrophobic polymer comprises a polyolefin selected from the group consisting of polyethylene (PE), polypropylene (PP), and combinations thereof.

* * * * *